United States Patent
Kalbfleisch

(10) Patent No.: US 10,448,779 B2
(45) Date of Patent: Oct. 22, 2019

(54) BEVERAGE MAKER

(71) Applicant: Alan Paul Kalbfleisch, Waterloo (CA)

(72) Inventor: Alan Paul Kalbfleisch, Waterloo (CA)

( * ) Notice: Subject to any disclaimer, the term of this patent is extended or adjusted under 35 U.S.C. 154(b) by 0 days.

(21) Appl. No.: 16/059,122

(22) Filed: Aug. 9, 2018

(65) Prior Publication Data
US 2018/0344072 A1    Dec. 6, 2018

Related U.S. Application Data

(63) Continuation of application No. PCT/CA2017/050085, filed on Jan. 27, 2017.

(60) Provisional application No. 62/293,801, filed on Feb. 11, 2016.

(51) Int. Cl.
*A47J 31/20* (2006.01)
*A47J 31/18* (2006.01)
*A45F 3/16* (2006.01)

(52) U.S. Cl.
CPC ............ *A47J 31/20* (2013.01); *A45F 3/16* (2013.01); *A47J 31/18* (2013.01)

(58) Field of Classification Search
CPC  A47J 31/005; A47J 31/24; A47J 31/34; A47J 31/18; A47J 31/20; A45F 3/16
USPC ............................. 99/297, 317, 318, 319, 323
See application file for complete search history.

(56) References Cited

U.S. PATENT DOCUMENTS

| | | | | |
|---|---|---|---|---|
| 2,311,759 A | * | 2/1943 | Johnson | A47J 31/20 99/297 |
| 2,741,174 A | * | 4/1956 | Casey | A47J 31/20 99/283 |
| 2,868,110 A | * | 1/1959 | Kehoe | A47J 31/20 138/46 |
| 4,176,588 A | * | 12/1979 | Baron | A47J 31/02 210/469 |
| 6,561,080 B1 | * | 5/2003 | Feeney | A47J 31/24 99/295 |
| 7,559,274 B2 | * | 7/2009 | Wilhite | A47J 31/20 426/433 |

(Continued)

FOREIGN PATENT DOCUMENTS

| | | |
|---|---|---|
| FR | 2282838 A1 | 3/1976 |
| WO | 2002/067739 A1 | 9/2002 |

OTHER PUBLICATIONS

International Preliminary Report on Patentability dated Aug. 14, 2018 on International Patent Application PCT/CA2017/050085.

*Primary Examiner* — Ibrahime A Abraham
*Assistant Examiner* — Frederick F Calvetti
(74) *Attorney, Agent, or Firm* — Brunet & Co. Ltd.

(57) ABSTRACT

A beverage maker, particularly for coffee or tea, includes an outer receptacle for containing a mixture of a liquid and a solid beverage making material. A filter element mountable within the outer receptacle divides the outer receptacle into a fluid flow space between the filter element and a closed bottom of the outer receptacle, and a holding space between the filter element and a top of the outer receptacle where the liquid and solid material are mixed to form a beverage. An inner housing having a beverage receptacle may slide in the outer receptacle to filter the beverage through the substantially stationary filter element to provide the beverage in the fluid flow space. Under continued pressure, the beverage is forced into at least one fluid flow conduit fluidly connecting the fluid flow space to the beverage receptacle to fill the beverage receptacle.

20 Claims, 14 Drawing Sheets

(56) References Cited

U.S. PATENT DOCUMENTS

| | | | |
|---|---|---|---|
| 7,849,784 B2 | 12/2010 | Adler | |
| 8,234,971 B2* | 8/2012 | Cerroni | A47J 31/38 99/287 |
| 9,492,027 B2* | 11/2016 | Morse | A47J 31/20 |
| 2009/0229472 A1* | 9/2009 | Ferrara, Jr. | A47J 31/005 99/323 |
| 2010/0224078 A1* | 9/2010 | Khalifa | A47J 31/20 99/323 |
| 2011/0083560 A1* | 4/2011 | Chen | A47J 31/20 99/279 |
| 2015/0196158 A1 | 7/2015 | Velasquez | |
| 2015/0282664 A1 | 10/2015 | Savage et al. | |
| 2016/0262564 A1* | 9/2016 | Scott | A47J 31/005 |
| 2017/0071396 A1* | 3/2017 | McLean | A47J 31/20 |
| 2017/0127696 A1* | 5/2017 | Lown | A47J 31/06 |
| 2017/0231418 A1* | 8/2017 | Bebo | A47J 31/06 99/323 |
| 2018/0192809 A1* | 7/2018 | Harper | A47J 31/20 |

* cited by examiner

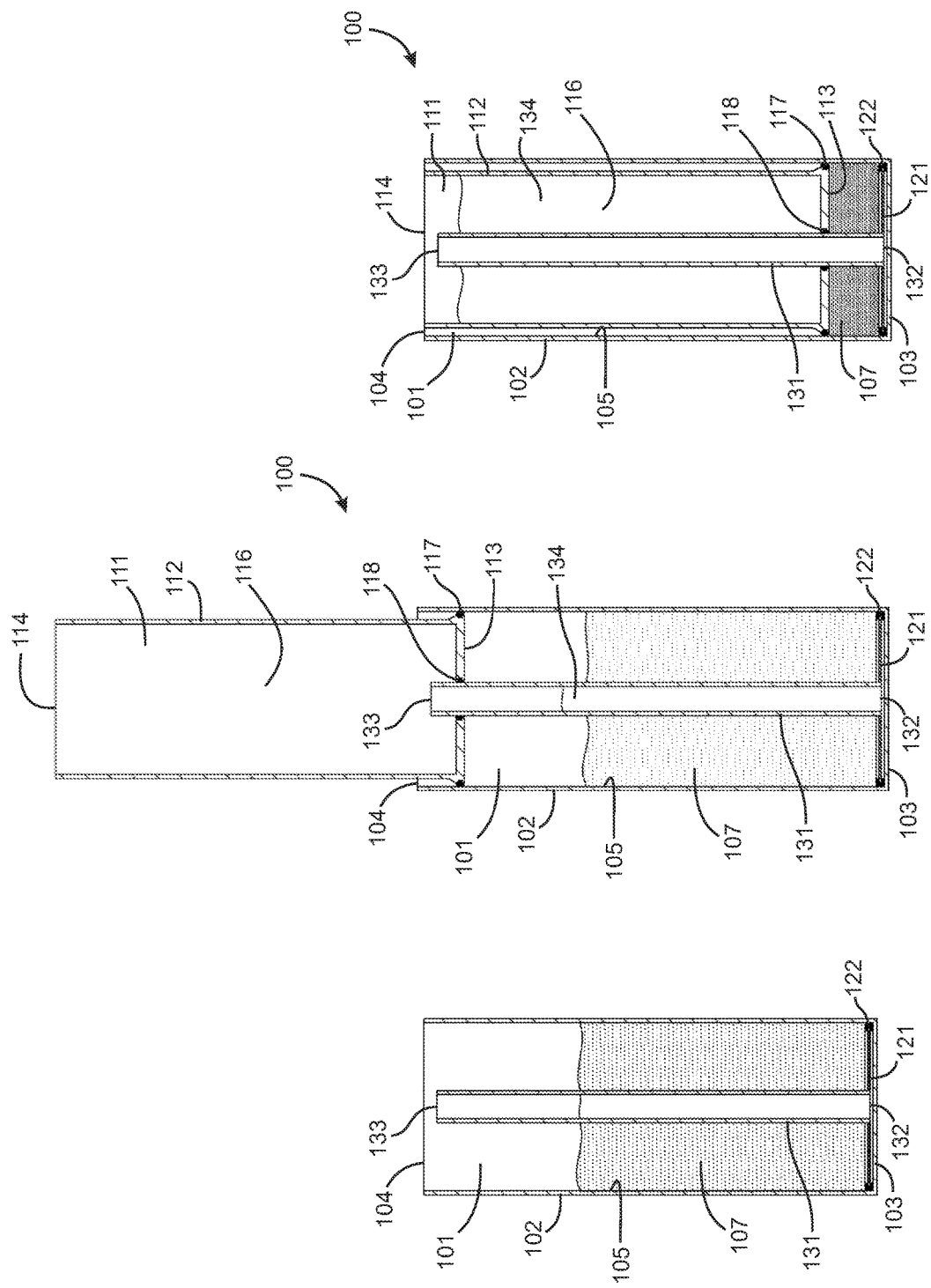

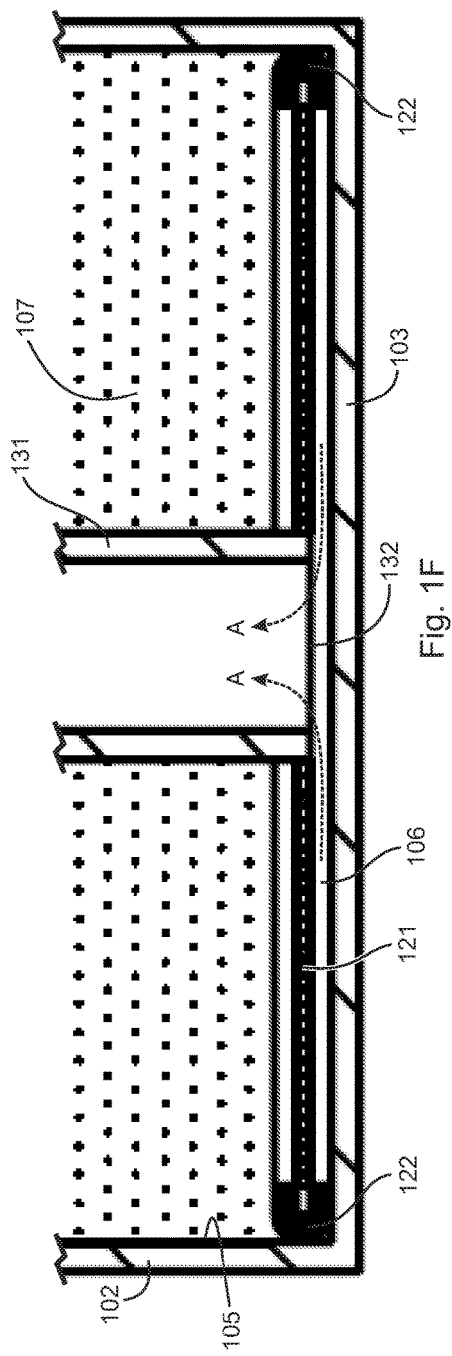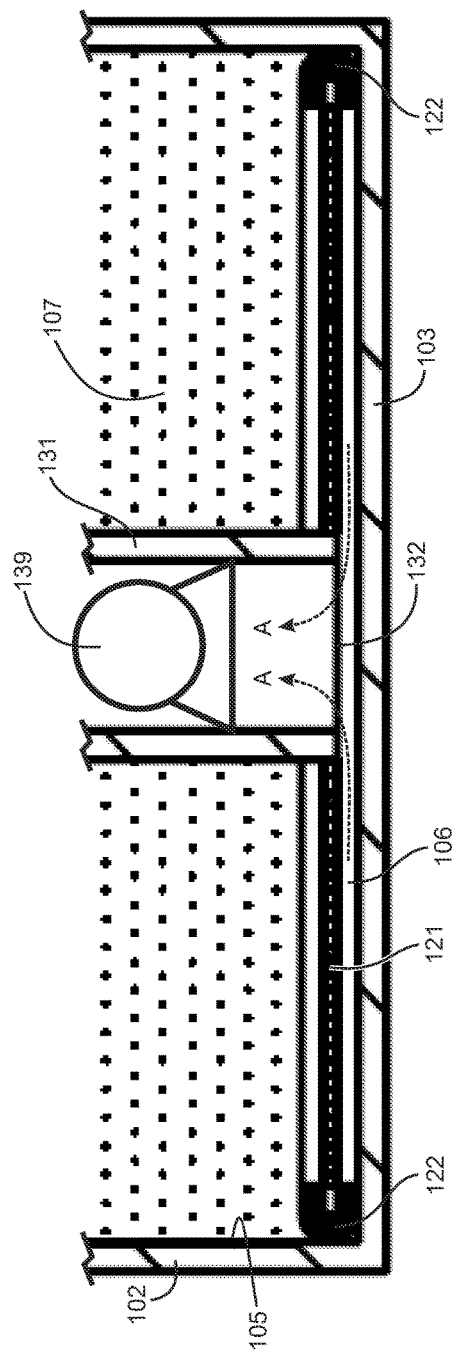

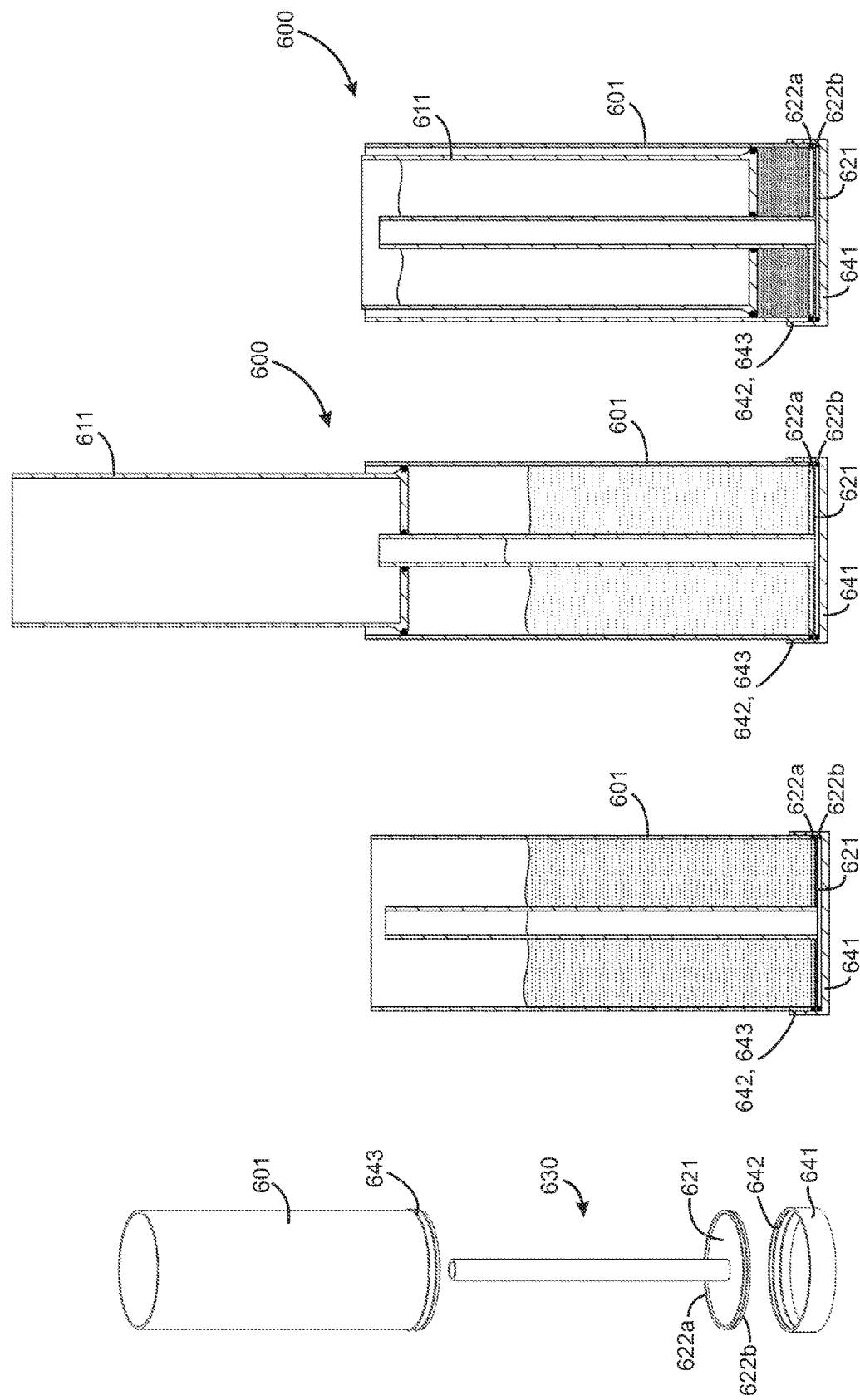

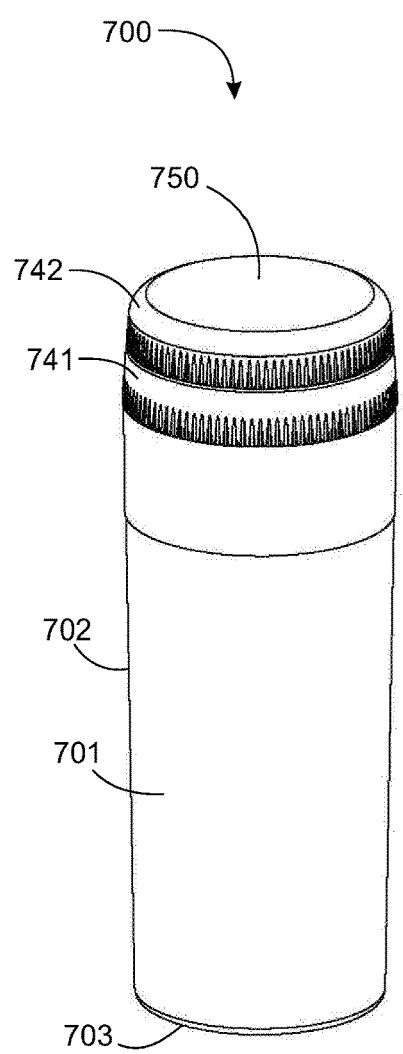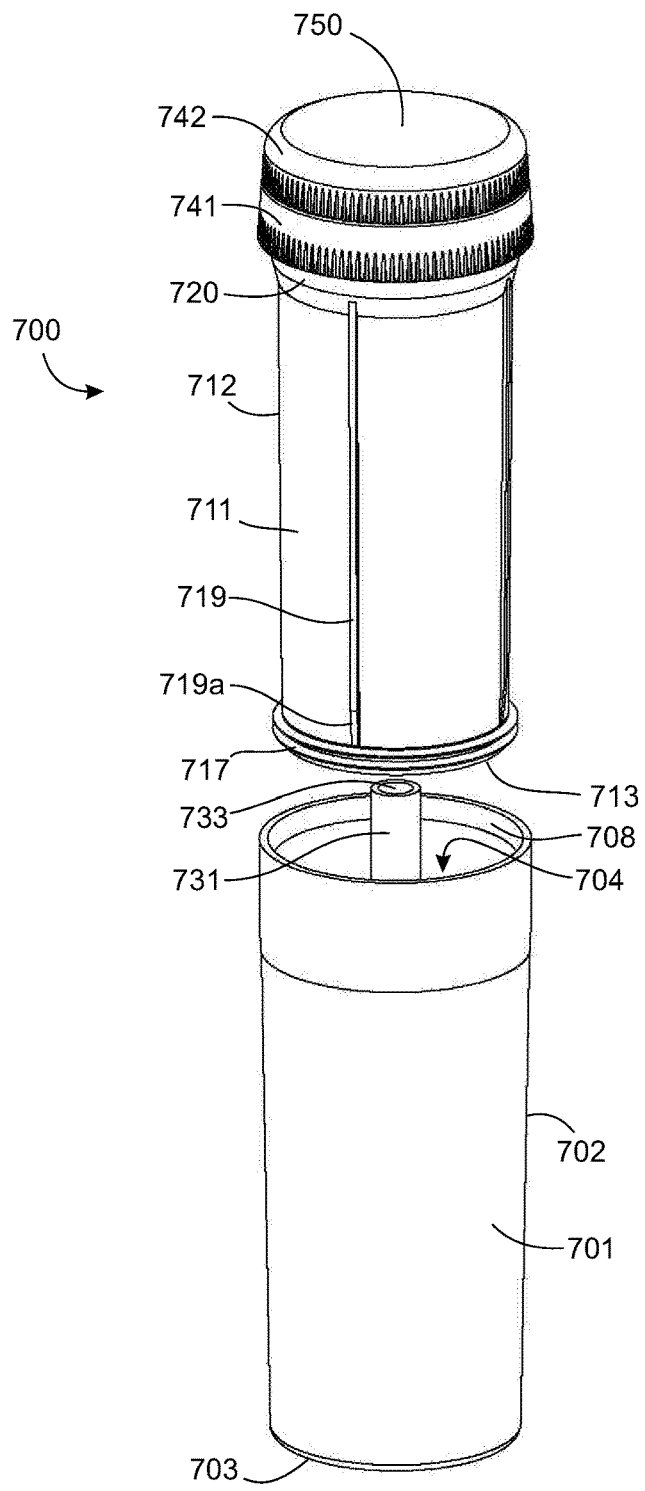
Fig. 7A                    Fig. 7B

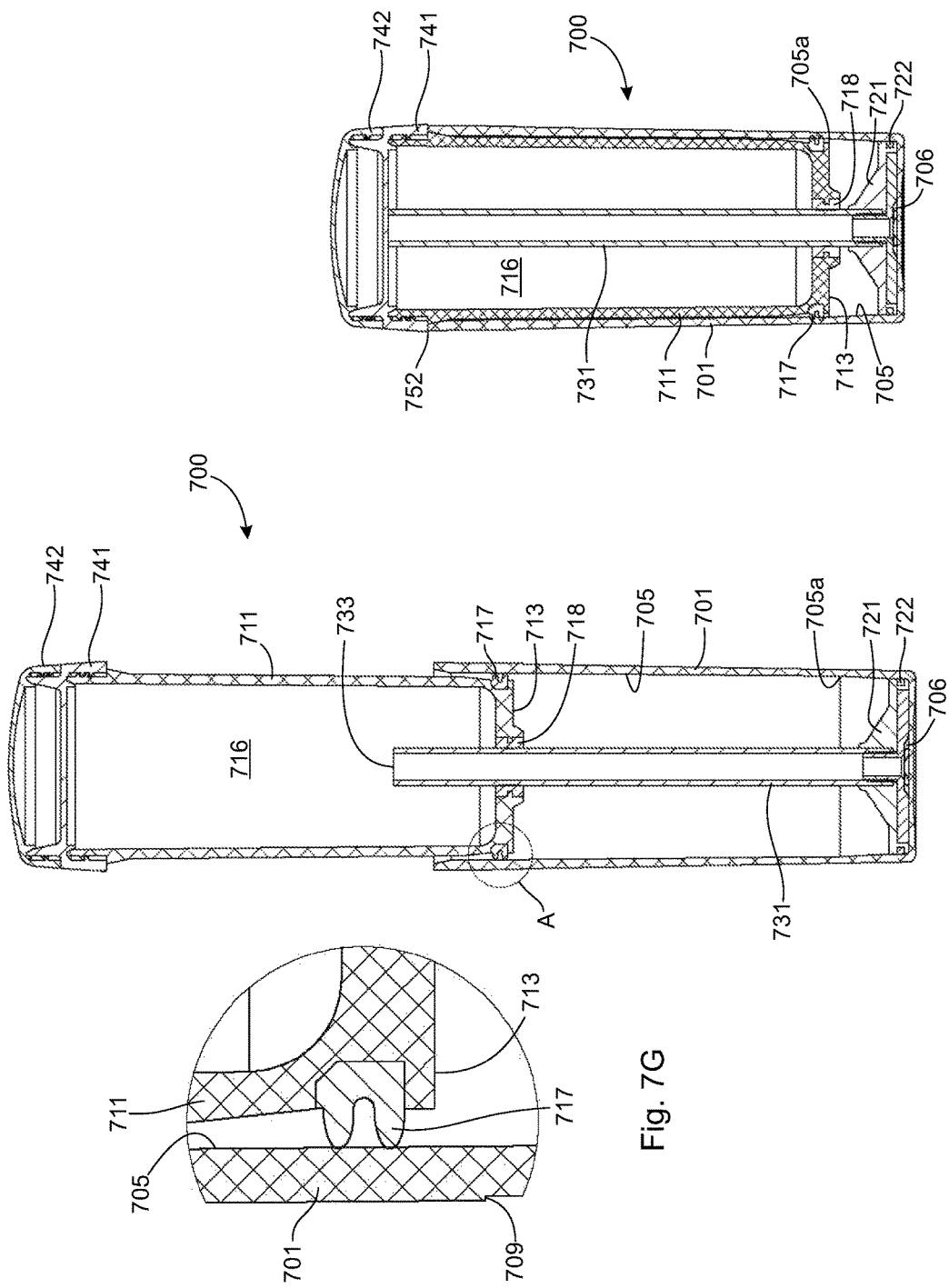

BEVERAGE MAKER

CROSS-REFERENCE TO RELATED APPLICATIONS

This application is a continuation of PCT/CA2017/050085, filed Jan. 27, 2017, which claims the benefit of U.S. Patent Application 62/293,801, filed Feb. 11, 2016, which are hereby incorporated herein by reference.

FIELD

This application relates to beverage makers, particularly to apparatuses and methods for making coffee or tea.

BACKGROUND

Coffee presses such as the French press are known in the art. Such presses involve steeping coffee particles in water, particularly hot water, to extract flavor and then transferring the flavored water to a drinking vessel.

U.S. Pat. No. 7,559,274 discloses a beverage making device for making a beverage from a liquid and a beverage making material. The device includes an outer housing, an inner housing, and a filter member. The outer housing is configured to hold a mixture of the liquid and the beverage making material. The inner housing is configured to be received within the outer housing and is configured to slide within the outer housing. The filter member has at least an outer peripheral edge coupled to the inner housing, and the filter member is configured to filter the mixture to provide the beverage as the inner housing slides within the outer housing. Such devices require specialized bendable filters having pull tabs in order to detach the filters from the inner housing in order to replace the filters or clean the inner housing. Further, because the filters must be bendable, the filter member must comprise an elaborate superstructure on the inner housing to support the filters. Furthermore, as with French presses, the device of U.S. Pat. No. 7,559,274 does not completely separate the made beverage from contact with the mixture containing the beverage making material because the contact remains through the filter member. Such contact permits further liquid to pass into the made beverage from the mixture after the beverage making is complete, which can impart undesirable flavors into the beverage.

U.S. Pat. No. 7,849,784 discloses a coffee or tea filtering press includes a hollow cylinder having top and bottom openings, a perforated removable cap which encloses the bottom opening, a removable piston which is inserted into the top opening and pressed downward to force liquid in the cylinder through the perforated cap, and a support to hold the press above the mouth of an open vessel. Such presses are not self-contained beverage makers because they require an external vessel to collect the filtered liquid, therefore requiring the provision of a separate device from which to drink the beverage, which is highly inconvenient when such a separate device cannot be found.

There remains a need for a self-contained beverage maker that includes a provision for collecting the beverage to permit drinking the beverage directly from the beverage maker, and which is simple to use, easy to clean, easy to maintain and in which the parts are easy to replace.

SUMMARY

There is provided a beverage maker comprising: an outer receptacle having a side wall and a closed bottom for containing a mixture of a liquid and a solid beverage making material; a filter element mountable within the outer receptacle, the filter element sealingly engaged with the side wall of the outer receptacle when mounted to inhibit flow of fluid between the filter element and the side wall of the outer receptacle, the filter element dividing the outer receptacle when mounted into a fluid flow space between the filter element and the closed bottom and a holding space between the filter element and a top of the outer receptacle where the liquid and solid beverage making material are mixed in a mixing zone to make the mixture; an inner housing having a beverage receptacle therein for containing a beverage to be drunk, the inner housing configured to be received in and slide in the outer receptacle, the inner housing sealingly engaged with the side wall of the outer receptacle to inhibit flow of fluid between the inner housing and the side wall of the outer receptacle when the inner housing slides within the outer receptacle, the filter element configured to remain substantially stationary and to filter the mixture to provide the beverage in the fluid flow space as the inner housing slides in the outer receptacle toward the closed bottom; and, at least one fluid flow conduit fluidly connecting the fluid flow space to the beverage receptacle.

There is further provided a method of making a beverage comprising: providing a solid beverage making material on a filter element mounted within an outer receptacle having a side wall and a closed bottom, the filter element sealingly engaged with the side wall of the outer receptacle to inhibit flow of fluid between the filter element and the side wall of the outer receptacle; introducing a liquid into the outer receptacle on to the solid beverage making material to form a mixture of the liquid and the solid beverage making material in a mixing zone of a holding space in the outer receptacle on one side of the filter element; allowing the liquid to extract flavors from the solid beverage making material for a period of time to form a liquid beverage with the solid beverage making material suspended therein; sliding an inner housing into the outer receptacle, the inner housing having a beverage receptacle, the inner housing sealingly engaged with the side wall of the outer receptacle to inhibit flow of fluid between the inner housing and the side wall of the outer receptacle as the inner housing slides within the outer receptacle, the sliding of the inner housing in the outer receptacle causing an increase in pressure on the mixture in the holding space thereby filtering the mixture through the filter element to another side of the filter element to provide the liquid beverage in a fluid flow space between the filter element and the closed bottom; and, continuing to slide the inner housing in the outer receptacle to further provide pressure on the mixture thereby causing the liquid beverage in the fluid flow space to flow into at least one fluid flow conduit fluidly connecting the fluid flow space to the beverage receptacle until the beverage receptacle contains a desired amount of the liquid beverage.

The outer receptacle has a side wall and a closed bottom configured to contain a mixture of a liquid (e.g. water) and a solid beverage making material. The solid beverage making material may be a material that has extractable flavors as well as insoluble components, for example coffee (e.g. coffee grounds) and tea (e.g. tea leaves). The outer receptacle may have a regular or irregular cross-sectional shape; although a regular cross-sectional shape (e.g. circular, oval, square, rectangular, etc.) is preferred for simplicity. The outer receptacle is preferably cylindrical, having a circular cross-section. The closed bottom of the outer receptacle prevents fluid from draining out the bottom of the outer receptacle. However, the closed bottom may be removable or not removable. For example, a non-removable closed bottom may be monolithic with the side walls, whereas a removable closed bottom may comprise a removable cap. The removable cap may have screw threads that are threadingly engaged with corresponding mating screw threads on an outside or an inside of the side wall, may be friction fitted to the inside or outside of the side walls, or may be connectable to the bottom of the outer receptacle in any other suitable manner. Preferably, the removable cap is sealingly engageable with the outer receptacle to inhibit fluid flow between the fluid flow space and an outside environment.

The filter element in the outer receptacle provides for the ability to separate liquid beverage from insoluble solid beverage making material once the liquid has extracted the flavors from the beverage making material to produce the beverage. The filter element comprises a filter membrane that is permeable to the liquid but prevents passage of the solid material. Materials for filter membranes are generally known in the art. The filter membrane may be rigid or flexible. The filter element may further comprise a rigid filter support, which may be especially useful for supporting a flexible filter membrane. When mounted in the outer receptacle, the filter element divides the outer receptacle into a fluid flow space between the filter element and the closed bottom and a holding space between the filter element and a top of the outer receptacle. In the holding space, the liquid and solid beverage making material are mixed in a mixing zone to make the mixture, thereby permitting the liquid to extract flavors from the solid beverage making material to produce the beverage. The mixing zone has a volume defined by the volume of the liquid in the holding space of the outer receptacle.

The filter element may be sealingly engaged with the side wall of the outer receptacle when mounted therein to inhibit flow of fluid between the filter element and the side wall of the outer receptacle. Sealing engagement of the filter element with the outer receptacle helps reduce contamination of the filtered liquid beverage with the mixture of liquid and solid beverage making material. Sealing engagement may be accomplished with the use of one or more seals, for example O-rings or other perimetrical flexible sealing elements. The one or more seals may be mounted on the filter element, on an inner face of the side wall of the outer receptacle or on both. Seals generally comprise a flexible material (e.g. a rubber, elastomer or thermoplastic material) that can conform to the shape of the filter element and the inner face of the side wall to seal a gap between the filter element and the side wall.

The filter element is mountable within the outer receptacle. The filter element may be mounted above the closed bottom to provide the fluid flow space between the filter element and the closed bottom. To mount the filter element above the closed bottom, a seal may be disposed around a perimeter of the bottom of the outer receptacle both to act as a seal to prevent fluid flow out of and into the fluid flow space and to act as a spacer between the filter element and the closed bottom. Alternatively, or in addition, one or more protuberances (e.g. a perimetrical ledge or spaced outcroppings may be provided in the outer receptacle to support the filter element above the closed bottom. The filter element may also comprise a perimetrical upwardly extending barrier configured to contain the solid beverage making material and configured to prevent the inner housing from sliding beyond a pre-set depth in the outer receptacle.

The filter element may be mounted permanently in the outer receptacle or may be dismountable from the outer receptacle. A dismountable filter element is preferred because the ability to remove the filter element facilitates cleaning the beverage maker and replacing the filter element when required. Whether or not the filter element is dismountable, the filter element may be configured to remain substantially stationary during operation of the beverage maker to filter the mixture to provide the beverage in the fluid flow space.

The inner housing is configured to be received and slide in the outer receptacle. The inner housing acts like a piston or plunger in the outer receptacle to force liquid from the mixture through the filter element into the fluid flow space. To maintain sufficient pressure to effect filtering, the inner housing may be sealingly engaged with the side wall of the outer receptacle to inhibit flow of fluid between the inner housing and the side wall of the outer receptacle when the inner housing slides within the outer receptacle. To provide sealing engagement of the inner housing with the side wall of the outer receptacle, at least a portion of the inner housing may have the same cross-sectional shape as the outer receptacle, while the portion is sized to be small enough to slide within the outer receptacle. In one embodiment, both the outer receptacle and the inner housing may be cylindrical, with the inner housing having a smaller outer diameter than an inner diameter of the outer receptacle. Sealing engagement may result from a close friction fit between the portion of the inner housing and the side wall of the outer receptacle. Alternatively, or additionally, the inner housing may comprise one or more seals to provide sealing engagement with the side wall of the outer receptacle. Seals generally comprise a flexible material (e.g. a rubber, elastomer or thermoplastic material) that can conform to the shape of the portion of the inner housing and the inner face of the side wall of the outer receptacle to seal a gap between the side wall and the portion of the inner housing. In any event, the seal should not be so tight as to prevent sliding of the inner housing in the outer receptacle.

The inner housing has a beverage receptacle therein for containing a beverage to be drunk. In one embodiment, the inner housing may have a hollow that serves as the beverage receptacle. In one embodiment, the inner housing may comprise a relatively thin bottom and side wall, and the beverage receptacle occupies most of the volume of the inner housing.

At least one fluid flow conduit fluidly connects the fluid flow space to the beverage receptacle in the inner housing. There may be one or more fluid conduits, for example one fluid conduit. The at least one fluid conduit may be inside, outside or both inside and outside the outer receptacle. The at least one fluid conduit may comprise a valve configured to inhibit fluid flow from the beverage receptacle through the at least one fluid flow conduit into the fluid flow space. For example, the at least one fluid conduit may comprise one or more one-way valves configured to inhibit fluid flow from the beverage receptacle through the at least one fluid flow conduit into the fluid flow space. Preferably, the fluid flow conduit is inside the outer receptacle to preserve the integrity of the bottom and/or side wall of the outer receptacle and to reduce the number of external structures on the beverage maker.

In one embodiment, the inner housing may comprise a bottom having a through aperture into the beverage receptacle. The at least one fluid flow conduit may comprise a tube extending between the filter element and the beverage receptacle, the extending tube passing through the mixing zone. As the inner housing slides in the outer receptacle toward the closed bottom, the tube may pass through the through aperture in the bottom of the inner housing.

The tube may be sealingly engaged with the filter element to inhibit fluid flow between the tube and the mixing zone. The tube may be sealingly engaged with the through aperture in the bottom of the inner housing to inhibit fluid flow between the holding space and the beverage receptacle. Sealing engagement may result from a close friction fit and/or may be provided by one or more seals. Seals generally comprise a flexible material (e.g. a rubber, elastomer or thermoplastic material) that can conform to an appropriate shape to prevent fluid flow through joints between structures being sealed together. In any event, the seals should not be so tight as to prevent sliding of the inner housing in the outer receptacle.

The tube may extend from any part of the filter element provided the through aperture is appropriately located on the bottom of the inner housing to permit the inner housing to slide in the outer receptacle while the bottom of the inner housing passes around the tube. In one embodiment, the outer receptacle, the inner housing and the tube may be concentric. In one embodiment, the filter element and the tube may be part of a removable filter unit. The tube may be attached either separably or inseparably to the filter element in the filter unit.

In one embodiment, the filter element may comprise a filter disposed between a filter hub and a filter plate. The filter, filter hub and filter plate may be separable from one another. The tube and the filter plate may be removably joinable to secure at least a portion of the filter hub between the tube and the filter plate when the tube is joined to the filter plate thereby securing the securing the filter hub, filter plate, filter and tube to form the filter unit.

The tube may have an opening located above the mixing zone when the tube is positioned together with the filter in the outer receptacle. The liquid beverage may flow from the fluid flow conduit through the tube and out the opening in the tube into the beverage receptacle. The opening may be one or more openings in a top of the tube, one or more openings in a side of the tube or a combination thereof. In one embodiment, the tube has a closed top and one or more openings, for example one opening, in the side of the tube. The one or more openings in the side of the tube may be preferably located proximate the top of the tube. The closed top of the tube reduces the possibility that some of the solid beverage making material could enter the tube when the beverage maker is being loaded with the solid beverage making material.

As the inner housing slides in the outer receptacle toward the bottom, liquid beverage in the mixture is forced under pressure through the filter element into the fluid flow space, from where the liquid beverage is further forced under pressure through the at least one fluid flow conduit into the beverage receptacle in the inner housing. The beverage may be consumed directly from the beverage receptacle through an open top of the inner housing and an open top of the outer receptacle. Straw and/or pouring arrangements may be included to assist with beverage consumption, if desired. Advantageously, the beverage receptacle may be completely isolated from the mixing zone after the beverage is made to prevent undesirable flavors from migrating from the mixture into the beverage after the beverage is made. The one or more one-way valves in the at least one fluid conduit may prevent further contact of the liquid beverage with the mixture of the liquid and solid beverage making material. Alternatively, or in addition, the holding space may not be initially completely filled with the mixture, which provides a head of air between the bottom of the inner housing and the mixture as the inner housing slides in the outer receptacle. As a result, once the inner housing is fully inserted into the outer receptacle, the head of air acts to clear the liquid beverage from the fluid flow space and/or the at least one fluid flow conduit so that there is no further liquid contact between the mixture in the mixing zone and the liquid beverage in the beverage receptacle.

The inner housing may be prevented from sliding once the bottom of the inner housing has compacted the solid beverage making material against the filter element. In some embodiments, it may be desirable to prevent the inner housing from sliding beyond a pre-set depth in the outer receptacle. Various arrangements may be utilized to provide a pre-set depth for the sliding of the inner housing. For example, the filter element may comprise a perimetrical upwardly extending barrier configured to prevent the inner housing from sliding beyond the pre-set depth in the outer receptacle. Advantageously, the barrier may also be configured to contain the solid beverage making material, which facilitates cleaning as the filter element may act as a basket for the solid beverage making material when the filter element is removed from the outer receptacle. In another example, the at least one fluid conduit may comprise a strategically located protuberance configured to prevent the inner housing from sliding beyond the pre-set depth. The protuberance may be a section of the at least one fluid conduit having a larger diameter than a diameter of the through aperture when the at least one fluid conduit comprises a tube extending through the through aperture. In yet another example, the side wall of the outer tube may comprise a protuberance strategically located to prevent the inner housing from sliding beyond the pre-set depth. In yet another example, the outer receptacle may comprise a lower portion having a smaller cross-sectional area than an upper portion thereby preventing the inner housing from sliding beyond the pre-set depth in the outer receptacle.

The beverage maker may further comprise a lid. A lid is useful to prevent spillage of the mixture out the open top of the outer receptacle and of the beverage out the open top of the beverage receptacle in the inner housing. The lid may be configured not only to prevent spillage but also the help to insulate the liquids inside the beverage maker. Also, the lid may be configured to engage the inner housing assist with sliding the inner housing in the outer receptacle. However, because contents of the outer receptacle become pressurized during sliding of the inner housing toward the closed bottom, and depressurized during sliding of the inner housing way from the closed bottom, the lid preferably comprises a vent to equalize pressure as liquid is filtered into the fluid flow space and through the at least one fluid flow conduit.

In one embodiment, the lid may be configured to engage the top of the outer receptacle to prevent the inner housing from continuing to slide toward the closed bottom once the inner housing has reached a pre-determined depth in the outer receptacle. In another embodiment, the inner housing and the outer receptacle may comprise complementary chamfered portions that permit nesting of the inner housing in the outer receptacle at a pre-determined depth thereby preventing sliding of the inner housing in the outer receptacle beyond the pre-determined depth. The pre-determined depth may be the same as or different than the pre-set depth described above. In one embodiment, the lid may seal a gap between the inner housing and outer receptacle when the inner housing is at the pre-determined depth, thereby assisting with insulation. In one embodiment, the lid may be securable to the top of the outer receptacle or to a top of the inner housing. For example, the lid may be securable by threaded engagement of screw threads on the lid with mated screw threads at the top of the outer receptacle. In another example, the lid may be securable by threaded engagement of screw threads on the lid with mated screw threads at the top of the inner housing. In one embodiment, there may be two lids, a first lid removably securable to a top of the inner housing and a second lid removably securable to the open top of the first lid. The first lid may have an open top. The second lid having a closed top. The first lid may engage the top of the outer receptacle to form a seal between the inner housing and the outer receptacle. Other methods of securing the lid may be used instead of or in conjunction with mated threads, for example clasps, plugs, hooks, hook and loop connectors (e.g. Velcro™), and the like.

To make a beverage in the beverage maker, the filter element may be mounted in the outer receptacle with a desired amount of the solid beverage making material placed on the filter element before or after the filter element is mounted in the outer receptacle. A sufficient amount of the liquid may be poured into the outer receptacle through an open top of the outer receptacle to create the mixing zone in the holding space between the filter element and the open top of the outer receptacle. The mixture is allowed to sit for a desired length of time to extract a desired amount flavors from the solid beverage making material into the liquid. Before or after the desired length of time, the inner housing may be slid into the open top of the outer receptacle at least sufficiently to be secured in the outer receptacle. After the desired length of time has expired, the inner housing is slid into the outer receptacle to pressurize the mixture and force liquid beverage in the mixture through the filter element into the fluid flow space. Further sliding of the inner housing forces the liquid beverage in the fluid flow space through the fluid flow conduit into the beverage receptacle in the inner housing. The beverage may then be consumed directly from the beverage receptacle. Afterwards, the inner housing may be slid out of the outer housing and the remains in the outer receptacle may be disposed of through the open top of the outer receptacle. In embodiments where the bottom of the outer receptacle is removable, the bottom may be removed and the outer receptacle cleaned out through the bottom.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which:

FIG. 1C depicts a side cross-sectional view of the outer cylinder of FIG. 1B with the filter unit mounted therein, and hot water poured into the outer cylinder above a filter of the filter unit with coffee grounds suspended in the water;

FIG. 1D depicts the outer cylinder of FIG. 1C with the cylindrical plunger partially inserted into the outer cylinder;

FIG. 1E depicts the outer cylinder of FIG. 1C with the cylindrical plunger fully inserted into the outer cylinder;

FIG. 1F depicts a magnified view of the filter of the filter unit depicted in FIG. 1D;

FIG. 1G depicts a magnified view of an alternate embodiment of the filter unit depicted in FIG. 1D, wherein a filter tube comprises a one-way valve;

FIG. 6A depicts a perspective view of an outer cylinder and a removable filter unit of a sixth embodiment of a beverage maker of the present invention in which a closed bottom of the outer cylinder comprises a removable cap;

FIG. 6B depicts a side cross-sectional view of the outer cylinder of FIG. 6A with the filter unit mounted therein, and hot water poured into the outer cylinder above a filter of the filter unit with coffee grounds suspended in the water;

FIG. 6C depicts the outer cylinder of FIG. 6B with a cylindrical plunger partially inserted into the outer cylinder;

FIG. 6D depicts the outer cylinder of FIG. 6C with the cylindrical plunger fully inserted into the outer cylinder;

DETAILED DESCRIPTION

Figure 1A:
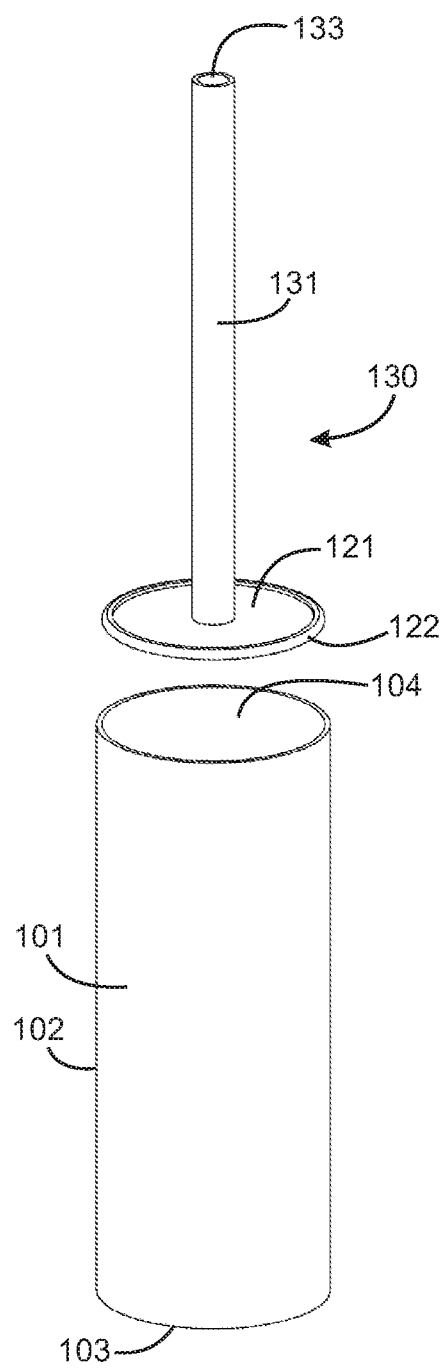
FIG. 1A depicts a perspective view of an outer cylinder and a removable filter unit of a first embodiment of a beverage maker of the present invention.

FIG. 1A, FIG. 1B, FIG. 1C, FIG. 1D, FIG. 1E and FIG. 1F depict a first embodiment of a beverage maker 100, particularly for making coffee. The beverage maker 100 comprises an outer cylinder 101 having a first cylindrical body 102 with a generally constant inner diameter, a closed first circular bottom 103 and an open first circular top 104. The beverage maker 100 further comprises an inner cylinder 111 having a smaller outer diameter than the inner diameter outer cylinder 101 and having a second cylindrical body 112 with a second circular bottom 113 and an open or vented second circular top 114, the second circular bottom 113 having a central orifice 115 connecting an outside of the inner cylinder 111 with a hollow inside 116 of the inner cylinder 111. The inner cylinder 111 further comprises a first elastomeric circular seal 117 (depicted as an O-ring) surrounding an outside perimeter of the inner cylinder 111 proximate the second circular bottom 113. The first seal 117 forms a seal between the inner cylinder 111 proximate the second circular bottom 113 and an inner surface 105 of the first cylindrical body 102 of the outer cylinder 101 without preventing the inner cylinder 111 from sliding in the outer cylinder 101.

A filter disk 121 having a diameter extending to the inner surface 105 of the first cylindrical body 102 may be inserted into the first cylindrical body 102 through the open first circular top 104 and mounted in the first cylindrical body 102 proximate the first circular bottom 103 to create a fluid flow gap 106 between the filter disk 121 and the closed first circular bottom 103 (see FIG. 1F), the fluid flow gap 106 separated from a mixture of water and coffee grounds 107 by the filter disk 121. The filter disk 121 comprises a second elastomeric circular seal 122 surrounding an outside perimeter of the filter disk 121 to form a seal between the filter disk 121 and the inner surface 105 of the first cylindrical body 102 of the outer cylinder 101. The second seal 122 also serves as a spacer to prevent the filter disk 121 from resting on the closed first circular bottom 103 thereby ensuring that the fluid flow gap 106 is maintained. In some embodiments, the second seal may be two separate seals, one placed on top of the filter disk and the other positioned underneath the filter disk.

The filter disk 121 is attached to an upwardly extending filter tube 131 to form a filter unit 130, the filter tube 131 having an open bottom end 132 and an open top end 133. The open bottom end 132 opens out to one side of the filter disk 121 and the open top end 133 opens out to the other side of the filter disk 121. The connection between the filter tube 131 and the filter disk 121 is sealed. The open bottom end 132 of the filter tube 131 is in fluid communication with the fluid flow gap 106. The filter tube 131 extends upwardly from a center of the filter disk 121, and the filter tube 131 has an outer diameter smaller than a diameter of the central orifice 115 in the second circular bottom 113. With the filter disk 121 inserted in the first cylindrical body 102, the filter tube 131 is aligned with the central orifice 115 permitting the inner cylinder 111 to slide in the outer cylinder 101 along the filter tube 131. A third elastomeric circular seal 118 surrounding the perimeter of the central orifice 115 forms a seal between the second circular bottom 113 and the filter tube 131. The filter unit 130 is removable from the outer cylinder 101 to facilitate loading and cleaning the beverage maker 100.

Figure 1B:
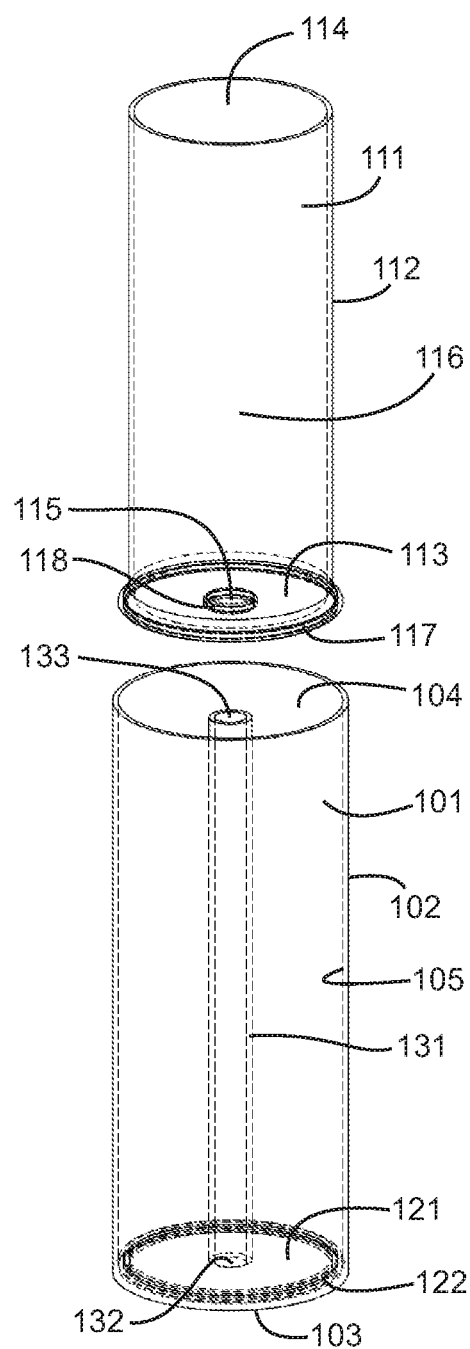
FIG. 1B depicts a transparent perspective view of the first embodiment of the beverage maker with the filter unit mounted in the outer cylinder and a cylindrical plunger poised to be inserted into the outer cylinder.

In one embodiment, to prepare coffee in the beverage maker 100, the filter unit 130 is inserted into the outer cylinder 101 through the open first circular top 104 as illustrated in FIG. 1A to mount the filter disk 121 proximate the closed first circular bottom 103 with the filter tube 131 extending vertically upward as illustrated in FIG. 1B. Coffee grounds and hot water may then be introduced into the outer cylinder 101 through the open first circular top 104 to form the mixture of hot water and coffee grounds 107 on top of the filter disk 121 and around the filter tube 131 as illustrated in FIG. 1C. The quantity of water used should be sufficient for extracting the desired flavors from the coffee grounds but small enough to avoid over-topping the filter tube 131. The second circular bottom 113 of the inner cylinder 111 is then inserted into the outer cylinder 101 through the open first circular top 104 so that the filter tube 131 passes through the central orifice 115 in the second circular bottom 113 of the inner cylinder 111 as illustrated in FIG. 1D. Inserting the inner cylinder 111 into the outer cylinder 101 pressurizes the mixture 107 causing some liquid coffee beverage 134 to be filtered through the filter disk 121 into the fluid flow gap 106, the solid coffee grounds being prevented from passing through the filter disk 121. The filter disk 121 remains substantially stationary during the filtering process. The liquid coffee beverage 134 in the fluid flow gap 106 flows substantially horizontally towards the open bottom end 132 of the filter tube 131 where the flow changes to a substantial vertical direction into the filter tube 131 along fluid flow paths A (see FIG. 1F). Because the filter tube 131 and the inner cylinder 111 comprise open tops 133, 114, respectively, there is no back pressure to prevent the liquid coffee beverage 134 from rising in the filter tube 131. At this point, as illustrated in FIG. 1D, the level of the liquid coffee beverage 134 in the filter tube 131 has risen but has not yet reached the open top end 133. The mixture 107 is then allowed to steep for a desired length of time. Alternatively, steeping may be performed prior to inserting the inner cylinder 111 into the outer cylinder 101. After steeping, the inner cylinder 111 may be slid in the outer cylinder 101 toward the filter disk 121 thereby filtering the mixture 107 under pressure through the filter disk 121 so that more of the liquid coffee beverage 134 flows into the fluid flow gap 106 and into the filter tube 131. The level of the liquid coffee beverage 134 rises in the filter tube 131 exiting the filter tube 131 through the open top end 133 entering the hollow inside 116 of the inner cylinder 111. With the inner cylinder 111 completely inserted in the outer cylinder 101, liquid coffee beverage 134 substantially fills the hollow inside 116 of the inner cylinder 111 and the mixture 107 above the filter disk 121 is substantially reduced in volume with the solid coffee grounds compacted on the filter disk 121 as illustrated in FIG. 1E. The liquid coffee beverage 134 may be consumed directly from the hollow inside 116 of the inner cylinder 111 while the inner cylinder 111 remains inside the outer cylinder 101. Once the liquid coffee beverage 134 is consumed, the beverage maker 100 may be cleaned by removing the inner cylinder 111 from the outer cylinder 101, and then removing the filter unit 130 from the outer cylinder 101, followed by disposing of the remaining mixture 107 and washing the various parts of the beverage maker 100.

FIG. 1G depicts a magnified view of an alternate embodiment of the filter unit 130 depicted in FIG. 1D, wherein the filter tube 131 comprises a one-way valve 139 to permit the liquid coffee beverage 134 to flow vertically in the filter tube 131, but to prevent the liquid coffee beverage 134 from flowing back into the fluid flow gap 106.

Figure 2A:
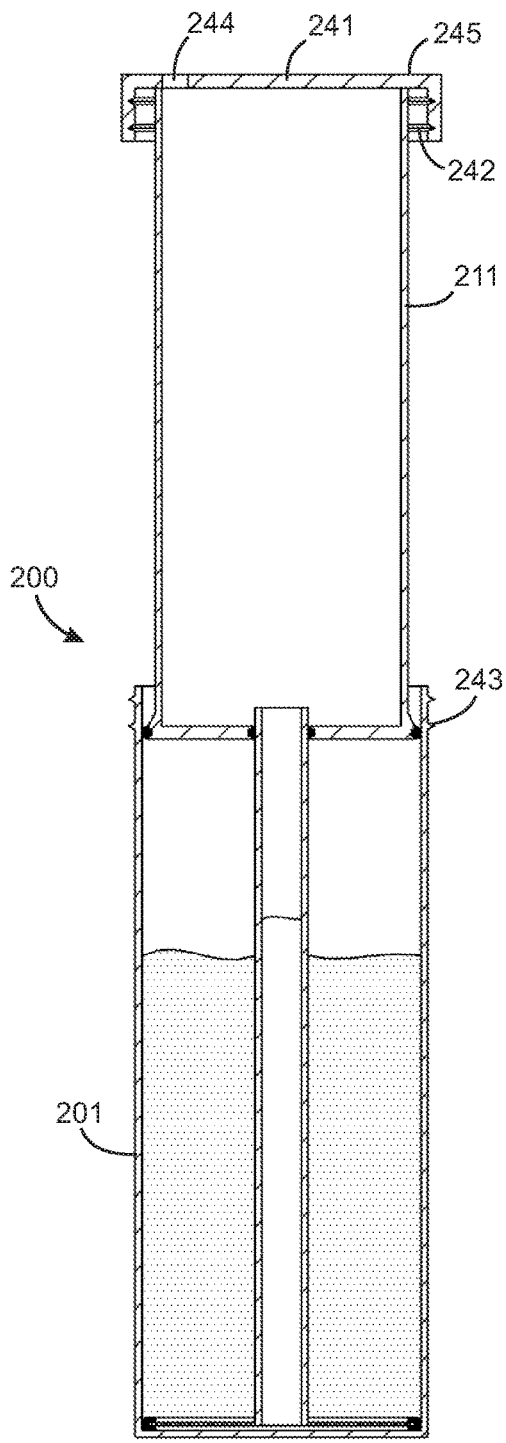
FIG. 2A depicts a side cross-sectional view of a second embodiment of a beverage maker of the present invention including an outer lid, and having a cylindrical plunger partially inserted in an outer cylinder.
Figure 2B:
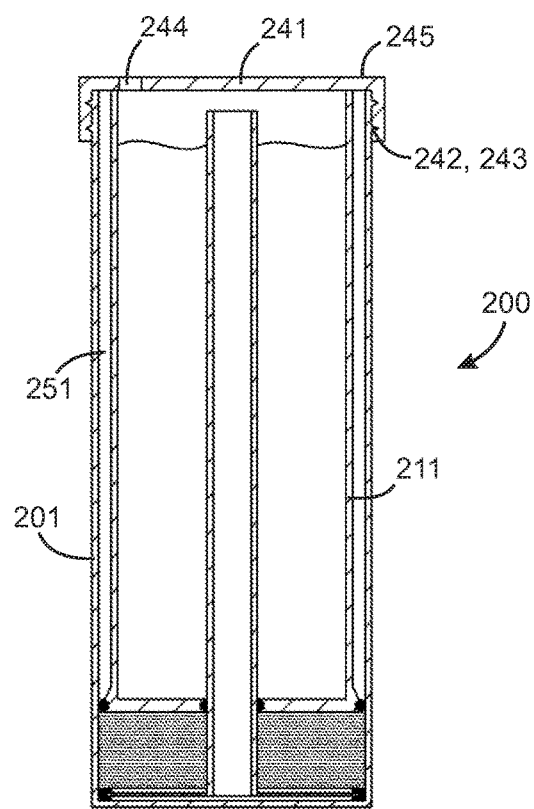
FIG. 2B depicts the beverage maker of FIG. 2A with the cylindrical plunger fully inserted into the outer cylinder.

FIG. 2A and FIG. 2B depict a second embodiment of a beverage maker 200. The beverage maker 200 is constructed and operates the same way as the beverage maker 100 except that the beverage maker 200 is equipped with a vented and removable lid 241. The lid 241 comprises inner screw threads 242 configured to be mated with outer screw threads 243 on an external surface and at a top of an outer cylinder 201 of the beverage maker 200. The lid 241 is configured to be fitted over a top of an inner cylinder 211 of the beverage maker 200, the lid 241 being useable to assist with pushing the inner cylinder 211 into the outer cylinder 201. A vent 244 through a top 245 of the lid 241 permits pressure equalization while the inner cylinder 211 slides in the outer cylinder 201. When the inner cylinder 211 is fully inserted in the outer cylinder 201, the lid 241 may be secured to the outer cylinder 201 by the threads 242, 243 as illustrated in FIG. 2B. Thus, the lid 241 may be used to prevent the inner cylinder 211 from sliding into the outer cylinder 201 beyond a pre-determined depth. The lid 241 also helps seal an air gap 251 between the inner cylinder 211 and the outer cylinder 201, which helps insulate the contents of the beverage maker 200.

Figure 3A:
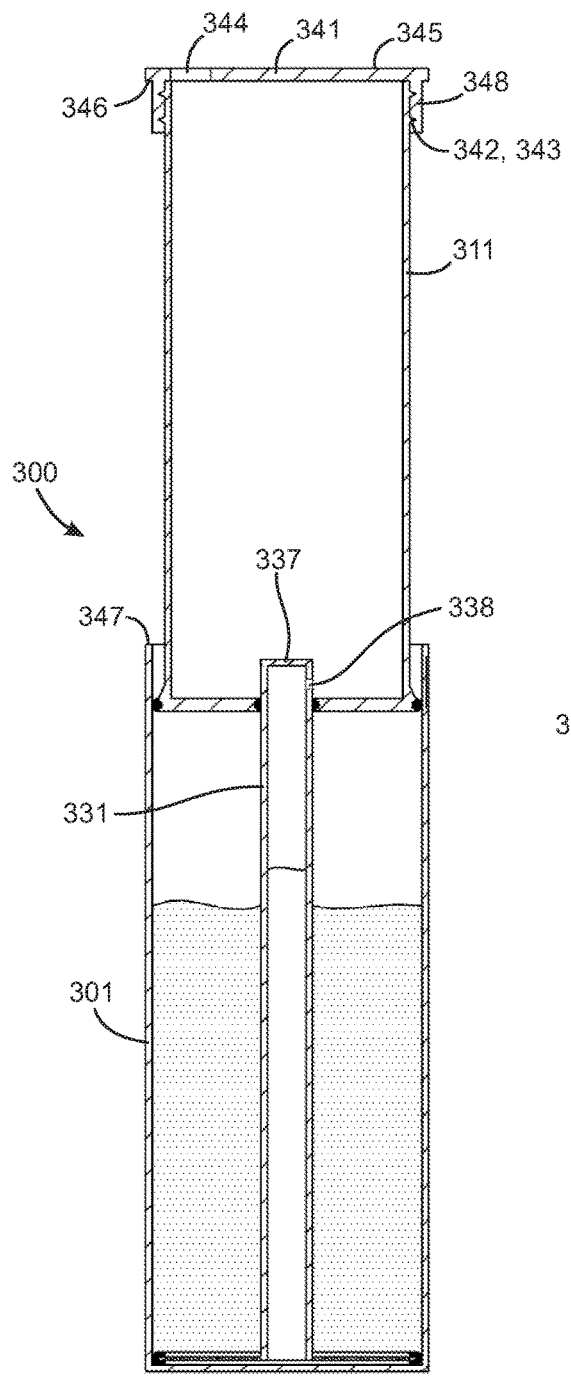
FIG. 3A depicts a side cross-sectional view of a third embodiment of a beverage maker of the present invention including an inner lid, and having a cylindrical plunger partially inserted in an outer cylinder.
Figure 3B:
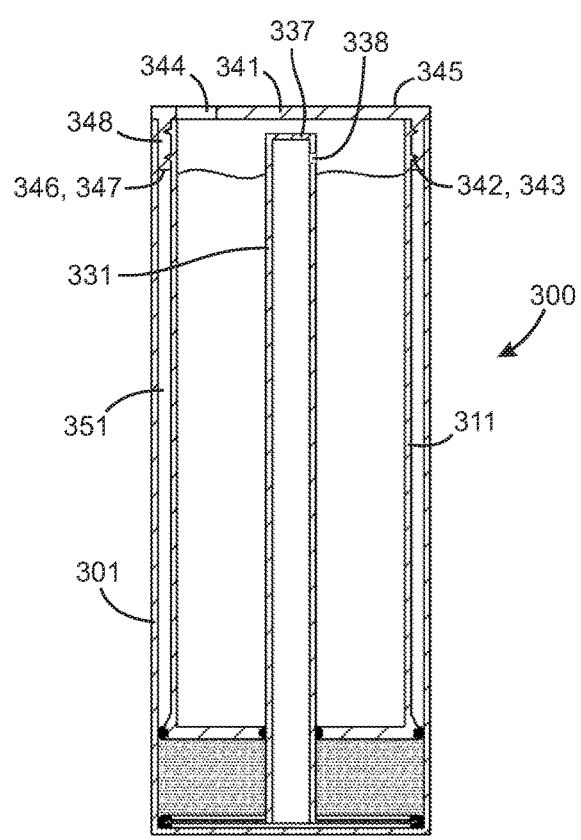
FIG. 3B depicts the beverage maker of FIG. 3A with the cylindrical plunger fully inserted into the outer cylinder.

FIG. 3A and FIG. 3B depict a third embodiment of a beverage maker 300. The beverage maker 300 is constructed and operates the same way as the beverage maker 100 except that the beverage maker 300 is equipped with a vented and removable lid 341 and a filter tube 331 having a closed top end 337 and an opening 338 in a side of the filter tube 331 proximate the closed top end 337. The lid 341 comprises inner screw threads 342 configured to be mated with outer screw threads 343 on an external surface at a top of an inner cylinder 311 of the beverage maker 300. The lid 341 may be secured to the top of the inner cylinder 311 by the threads 342, 343, the lid 341 being useable to assist with pushing the inner cylinder 311 into an outer cylinder 301 of the beverage maker 300. As illustrated in FIG. 3B, an annular band 348 of the lid 341 is sufficiently thin to fit in an air gap 351 between the inner cylinder 311 and the outer cylinder 301 during a final phase of sliding the inner cylinder 311 in the outer cylinder 301. A vent 344 through a top 345 of the lid 341 permits pressure equalization in the beverage maker 300 during the final phase of sliding the inner cylinder 311 in the outer cylinder 301. A perimetrical annular projection 346 around the lid 341 abuts an upper rim 347 of the outer cylinder 301 when the inner cylinder 311 is fully inserted in the outer cylinder 301 to help seal the air gap 351. Thus, the lid 341 may be used to prevent the inner cylinder 311 from sliding into the outer cylinder 301 beyond a pre-determined depth. The lid 341 also helps seal an air gap 351, which helps insulate the contents of the beverage maker 300. The closed top end 337 of the filter tube 331 helps prevent coffee grounds from entering the filter tube 331 when the coffee grounds are loaded into the outer cylinder 301. The opening 338 in the side of the filter tube 331 permits liquid coffee beverage to flow from the filter tube 331 into a hollow inside of the inner cylinder 311.

Figure 4D:
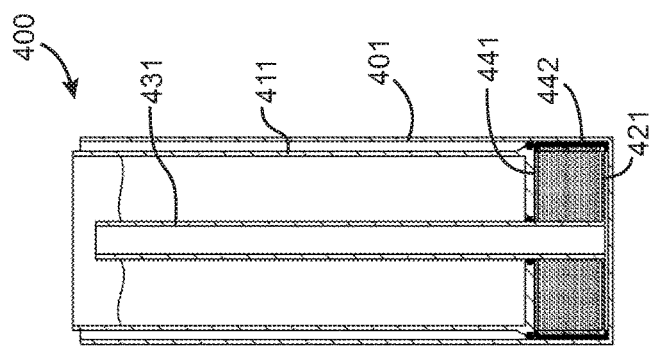
FIG. 4D depicts the outer cylinder of FIG. 4C with the cylindrical plunger fully inserted into the outer cylinder.
Figure 4C:
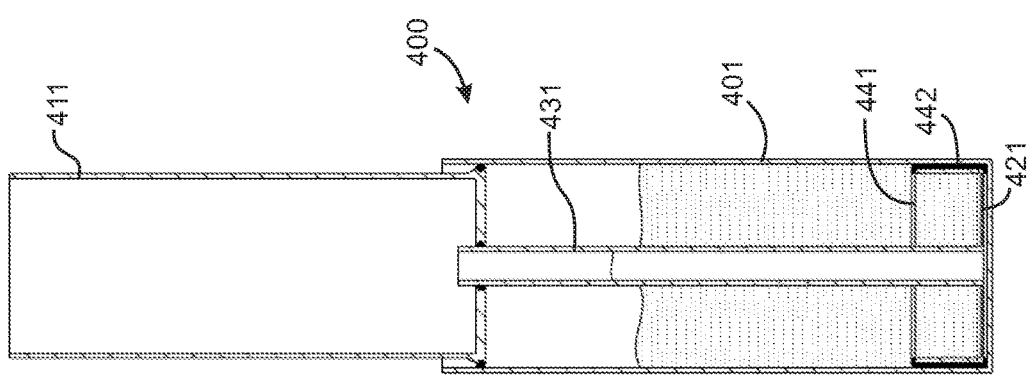
FIG. 4C depicts the outer cylinder of FIG. 4B with a cylindrical plunger partially inserted into the outer cylinder.
Figure 4B:
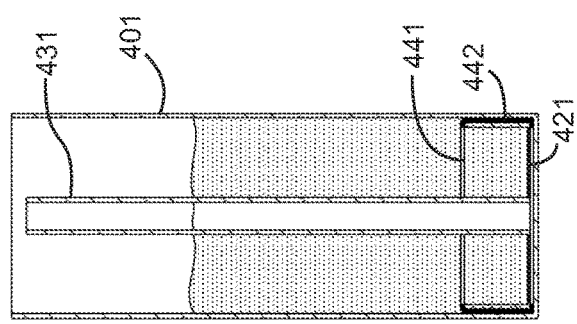
FIG. 4B depicts a side cross-sectional view of the outer cylinder of FIG. 4A with the filter unit mounted therein, and hot water poured into the outer cylinder above a filter of the filter unit with coffee grounds suspended in the water.
Figure 4A:
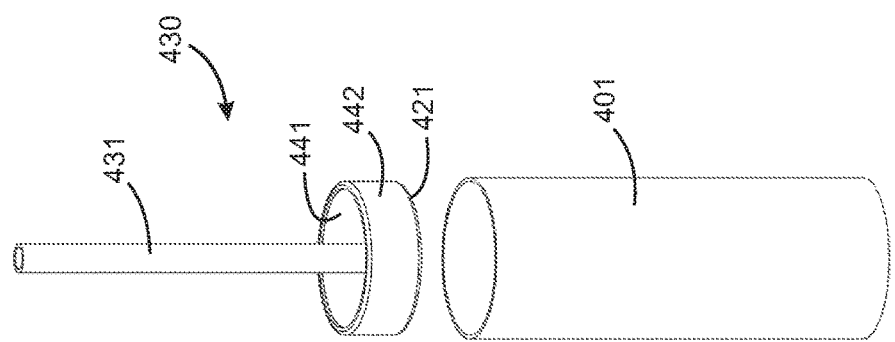
FIG. 4A depicts a perspective view of an outer cylinder and a removable filter unit of a fourth embodiment of a beverage maker of the present invention in which a filter of the filter unit has a raised outer edge.

FIG. 4A, FIG. 4B, FIG. 4C and FIG. 4D depict a fourth embodiment of a beverage maker 400. The beverage maker 400 is constructed and operates the same way as the beverage maker 100 except that the beverage maker 400 is equipped with a filter unit 430 comprising a filter disk 421 having an upwardly extending filter tube 431 and a perimetrical wall 441 extending upwardly from an upper surface of the filter disk 421. The perimetrical wall 441 converts the filter unit 430 into a basket configured to contain solid coffee grounds, which is useful to prevent spillage of the coffee grounds during both insertion of the filter unit 430 into an outer cylinder 401 of the beverage maker 400 and removal of the filter unit 430 from the outer cylinder 401. The perimetrical wall 441 may be provided with a perimetrical elastomeric seal 442 to seal the perimetrical wall 441 with an inner surface of the outer cylinder 401. As illustrated in FIG. 4D, the perimetrical wall 441 abuts a bottom of the inner cylinder 411 when the inner cylinder 411 is inserted into the outer cylinder 401 to prevent the inner cylinder 411 from sliding into the outer cylinder 401 beyond a pre-set depth.

Figure 5D:
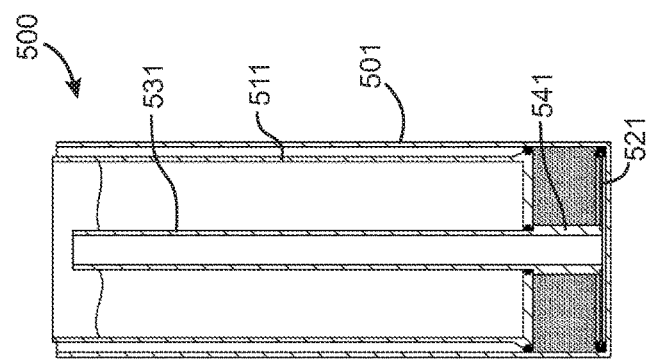
FIG. 5D depicts the outer cylinder of FIG. 5C with the cylindrical plunger fully inserted into the outer cylinder.
Figure 5C:
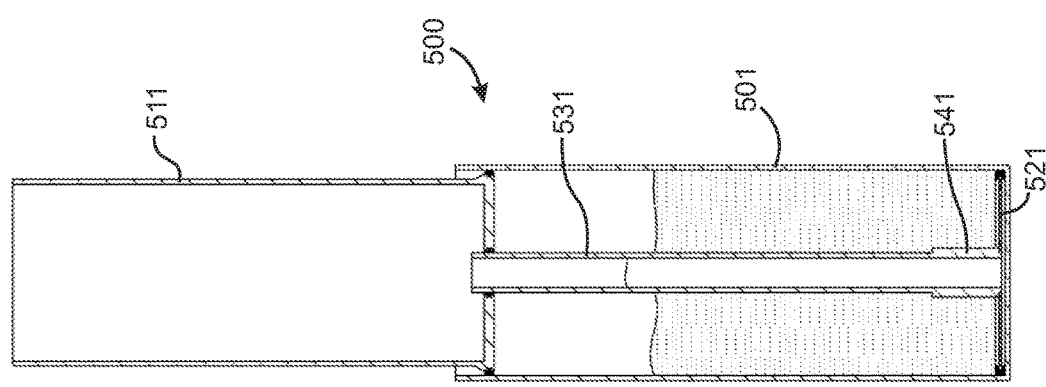
FIG. 5C depicts the outer cylinder of FIG. 5B with a cylindrical plunger partially inserted into the outer cylinder.
Figure 5B:
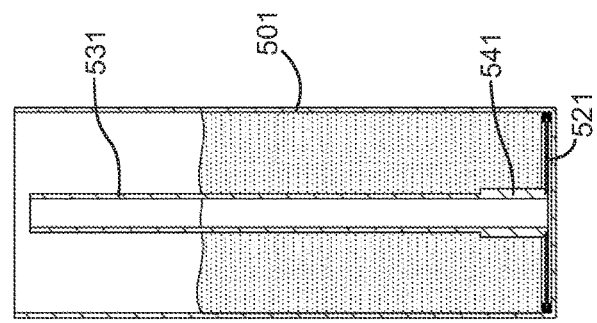
FIG. 5B depicts a side cross-sectional view of the outer cylinder of FIG. 5A with the filter unit mounted therein, and hot water poured into the outer cylinder above a filter of the filter unit with coffee grounds suspended in the water.
Figure 5A:
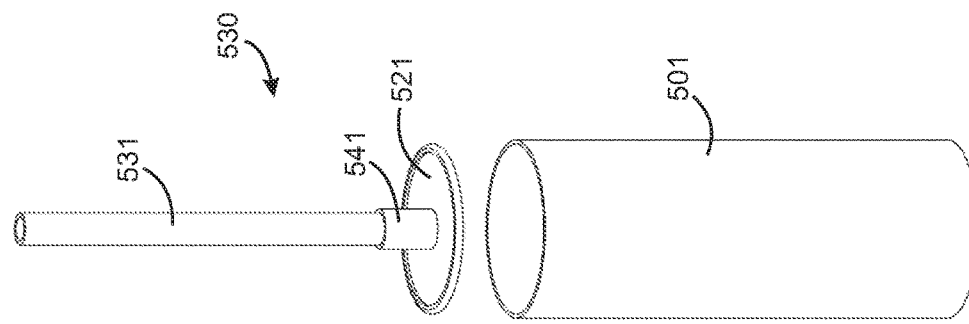
FIG. 5A depicts a perspective view of an outer cylinder and a removable filter unit of a fifth embodiment of a beverage maker of the present invention in which the filter unit has a raised inner portion.
Figure 7C:
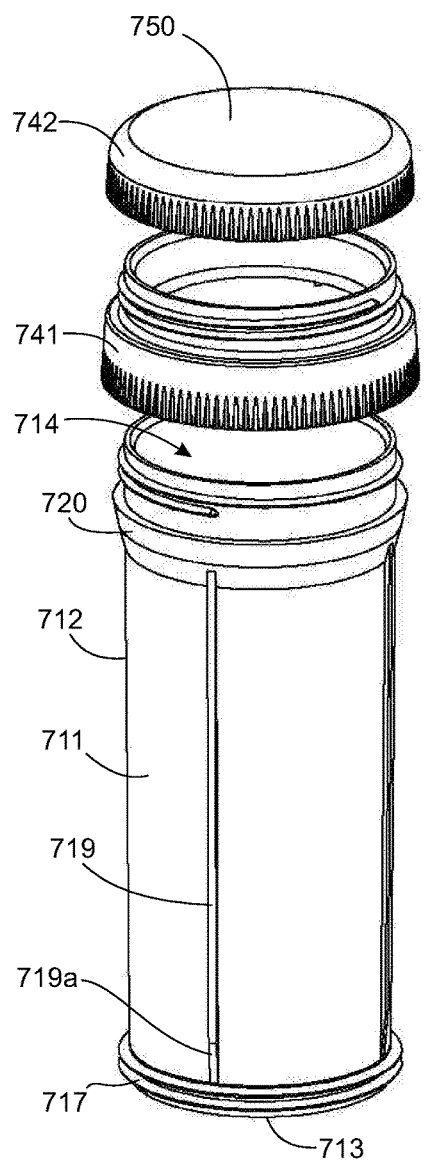
FIG. 7C depicts an exploded view of the cylindrical plunger of FIG. 7B.
Figure 7D:
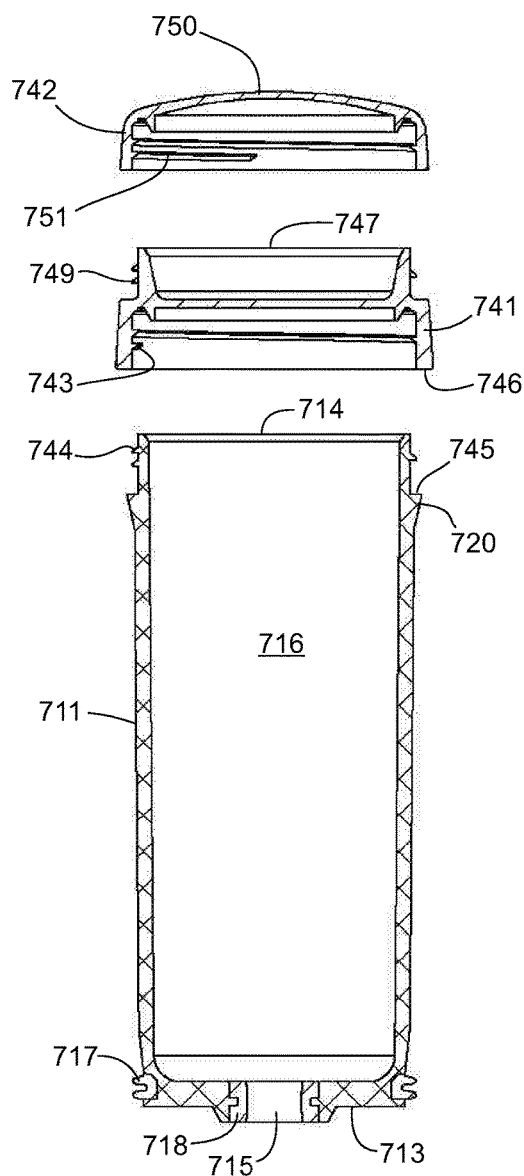
FIG. 7D depicts a side cross-sectional view of the cylindrical plunger of FIG. 7C.
Figure 7E:
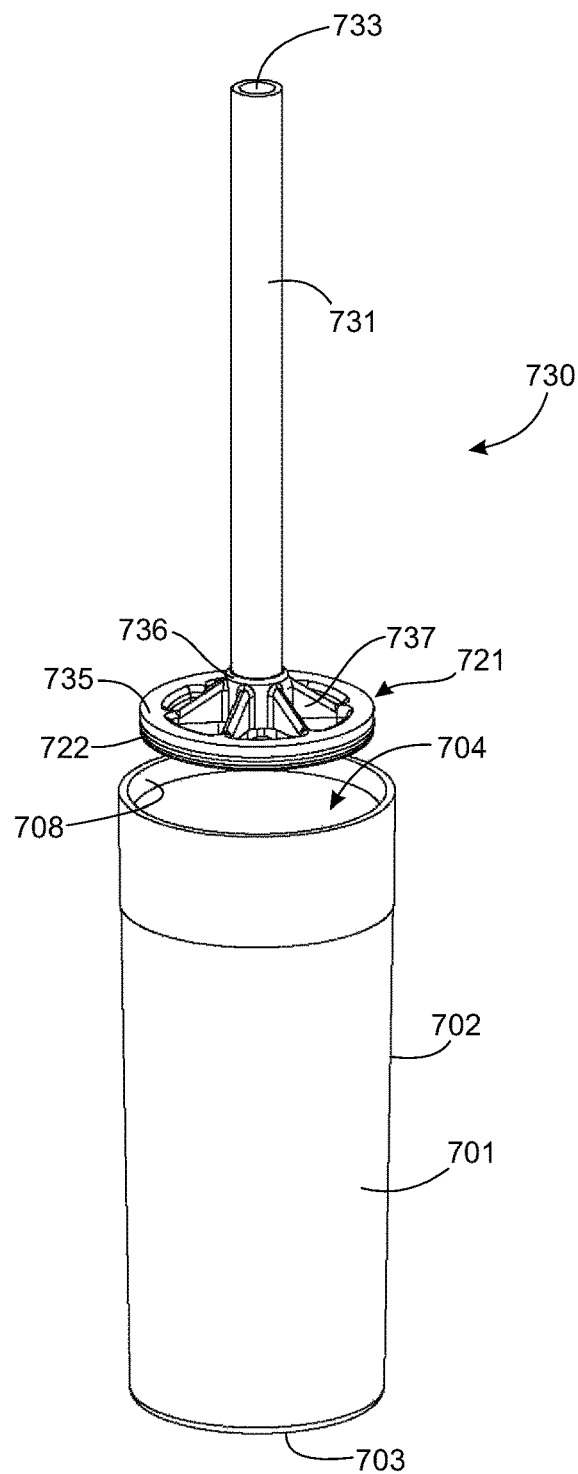
FIG. 7E depicts a perspective view of the outer cylinder of FIG. 7B in which a removable filter unit is poised to be inserted into the outer cylinder.
Figure 7I:
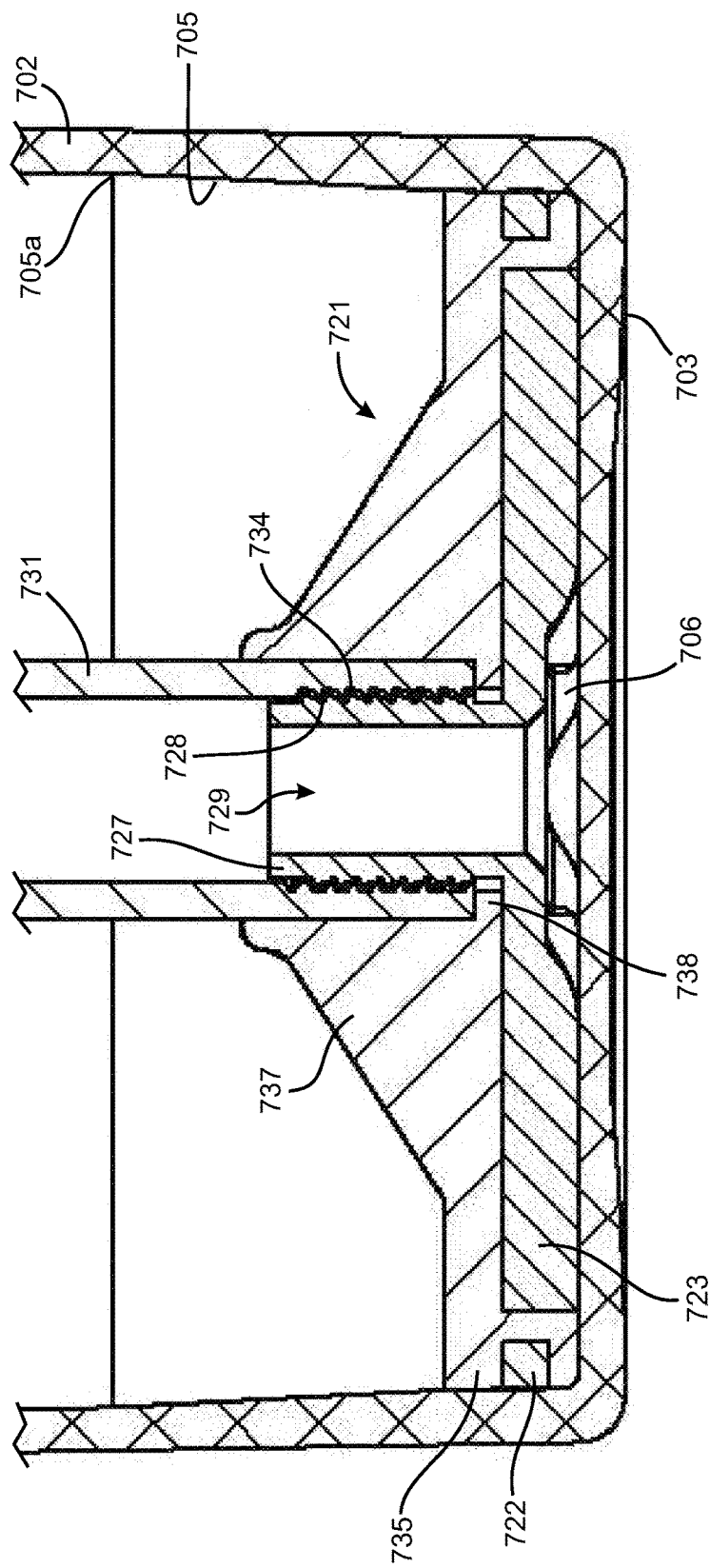
FIG. 7I depicts a magnified view of a bottom of the outer receptacle showing more detail of the removable filter unit in FIG. 7F; and, FIG. 7J depicts an exploded view of the removable filter unit of FIG. 7E.
Figure 7J:
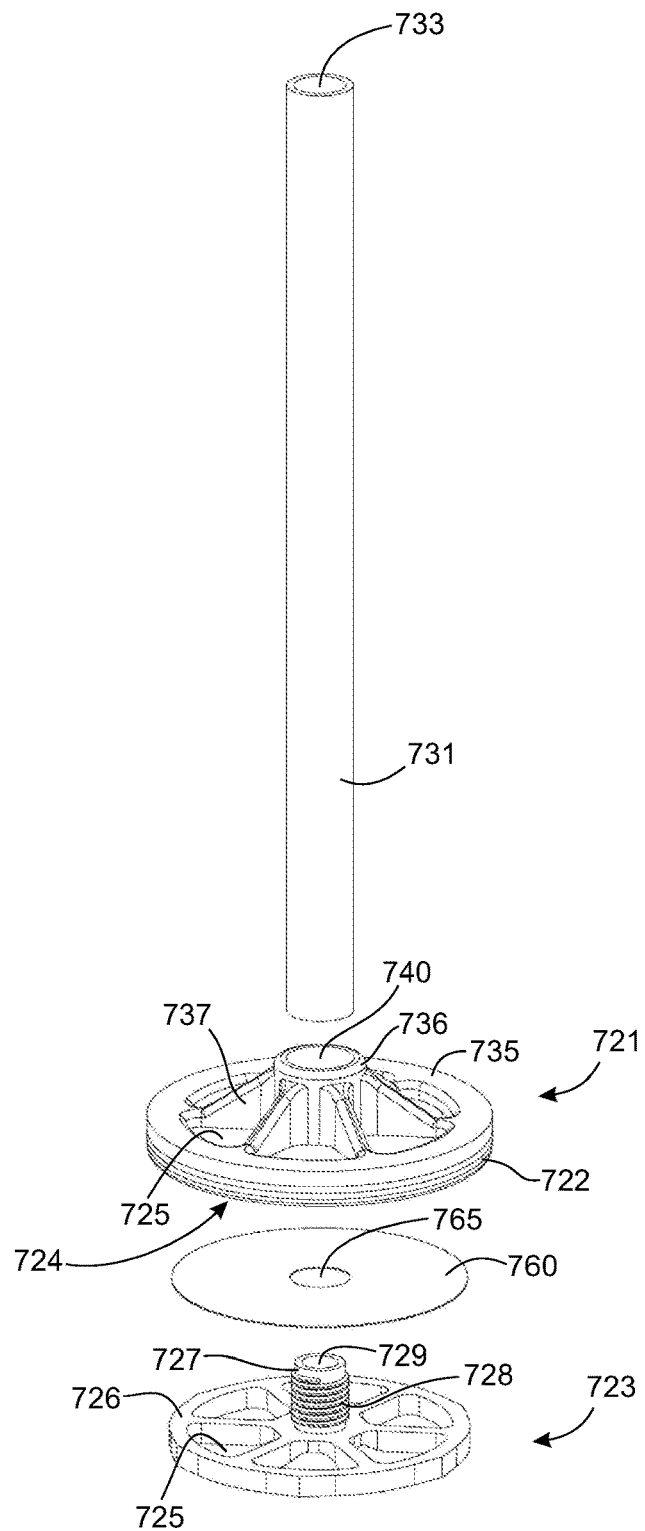
FIG. 7A depicts a perspective view of a seventh embodiment of a beverage maker of the present invention in a completely closed configuration.
FIG. 7B depicts a perspective view of the beverage maker of FIG. 7A with a cylindrical plunger poised to be inserted into an outer cylinder.
FIG. 7F depicts a side cross-sectional view of the beverage maker of FIG. 7A with a removable filter unit mounted in an outer cylinder and a cylindrical plunger partially inserted into the outer cylinder.
FIG. 7G depicts a magnified view of detail A in FIG. 7F.
FIG. 7H depicts the beverage maker of FIG. 7F with the cylindrical plunger fully inserted into the outer cylinder.

FIG. 5A, FIG. 5B, FIG. 5C and FIG. 5D depict a fifth embodiment of a beverage maker 500. The beverage maker 500 is constructed and operates the same way as the beverage maker 100 except that the beverage maker 500 is equipped with a filter unit 530 comprising a filter disk 521 having an upwardly extending filter tube 531, the filter tube 531 comprising a thicker portion 541 at a bottom of the filter tube 531. As illustrated in FIG. 5D, the thicker portion 541 of the filter tube 531 abuts a bottom of an inner cylinder 511 when the inner cylinder 511 is inserted into an outer cylinder 501 to prevent the inner cylinder 511 from sliding into the outer cylinder 501 beyond a pre-set depth.

FIG. 6A, FIG. 6B, FIG. 6C and FIG. 6D depict a sixth embodiment of a beverage maker 600. The beverage maker 600 is constructed and operates the same way as the beverage maker 100 except that the beverage maker 600 is equipped with a removable cap 641 to close an open bottom 603 of an outer cylinder 601 of the beverage maker 600. The removable cap 641 comprises inner screw threads 642 configured to be mated with outer screw threads 643 on an external surface and at a bottom of the outer cylinder 601. Screwing the cap 641 on to the bottom of the outer cylinder 601 closes the bottom of the beverage maker 600. The removable cap 641 permits opening the bottom of the beverage maker 600 to facilitate insertion and removal of a filter unit 630 as illustrated in FIG. 6A. The filter unit 630 comprises a filter disk 621 with an upper elastomeric seal 622a on top of and around the perimeter of the filter disk 621 and a lower elastomeric seal 622b positioned below and around the perimeter of the filter disk 621. The upper elastomeric seal 622a forms a seal between the filter disk 621 and the inner surface of the outer cylinder 601 as illustrated in FIG. 6B, FIG. 6C and FIG. 6D. The lower elastomeric seal 622b acts as a spacer to space the filter disk 621 above an inside surface of the cap 641 when the cap 641 closes the bottom of the outer cylinder 601 and forms a seal between the filter disk 621 and the cap 641 as illustrated in FIG. 6B, FIG. 6C and FIG. 6D. Thus, the seal 622 helps seal the screw threads 642, 643 to prevent fluid from entering or leaving the bottom of the outer cylinder 601 during operation of the beverage maker 600, especially when an inner cylinder 611 slides in the outer cylinder 601.

FIG. 7A, FIG. 7B, FIG. 7C, FIG. 7D, FIG. 7E, FIG. 7F, FIG. 7G, FIG. 7H, FIG. 7I and FIG. 7J depict a seventh embodiment of a beverage maker 700. The beverage maker 700 comprises an outer cylinder 701 having a first generally cylindrical body 702 with a closed first circular bottom 703 and an open first circular top 704. The first cylindrical body 702 has an inner surface 705 that tapers inwardly from the top 704 toward the bottom 703 at a first non-zero angle with respect to a longitudinal axis of the beverage maker 700. The first non-zero angle is provided to facilitate removal of the part from a mold during manufacturing. The actual angle for the first non-zero angle is not important. A suitable first non-zero angle may be about 0.5° with respect to the longitudinal axis of the beverage maker 700. At a bend 705a on the inner surface 705, the inner surface 705 tapers inwardly at a second non-zero angle with respect to the longitudinal axis, the second non-zero angle being greater than the first non-zero angle. A thickening of an outer surface of the first cylindrical body 702 proximate the first circular top 704 provides a grip 709 to help prevent the beverage maker 700 from accidentally slipping out of a user's hand.

The beverage maker 700 further comprises an inner cylinder 711 having a smaller outer diameter than an inner diameter of the outer cylinder 701, The inner cylinder 711 has a second cylindrical body 712 with a second circular bottom 713 and an open or vented second circular top 714, the second circular bottom 713 having a central orifice 715 connecting an outside of the inner cylinder 711 with a hollow inside 716 of the inner cylinder 711. The inner cylinder 711 has an outer surface that is tapered in a complementary manner as the inner surface 705 of the first cylindrical body 702. The inner cylinder 711 may slide smoothly in the outer cylinder 701 until reaching the bend 705a in the inner surface 705 of the outer cylinder 701. The bend 705a provides an interference fit to help immobilize the inner cylinder 711 in the outer cylinder 701, and to prevent further longitudinal movement of the inner cylinder 711 at a pre-set depth in the outer cylinder 701 during operation of the beverage maker 700. A chamfer 708 around an inner surface of the open first circular top 704 engages a complementary chamfer 720 on the outer surface of the second cylindrical body 712 to prevent further longitudinal movement of the inner cylinder 711 beyond a pre-determined depth. The inner cylinder may further comprise one or more longitudinally oriented ribs 719 that are raised from an outer surface of the second cylindrical body 712 to minimize lateral movement of the inner cylinder 711 in the outer cylinder 701. The inner cylinder 711 further comprises a first elastomeric circular seal 717 (depicted as a double lip seal) surrounding an outside perimeter of the inner cylinder 711 proximate the second circular bottom 713. The first seal 717 forms a seal between the inner cylinder 711 proximate the second circular bottom 713 and the inner surface 705 of the first cylindrical body 702 of the outer cylinder 701 without preventing the inner cylinder 711 from sliding in the outer cylinder 701. The double lip seal 717 accommodates the taper angle and takes up greater space to form a better seal. Each rib 719 has a tapered bottom section 719a that gradually becomes less raised to ensure that the raised ribs 719 do not interfere with the ability of the first seal 717 to function.

The beverage maker 700 also comprises a filter unit 730 comprising a filter hub 721, a filter plate 723, a filter 760 and an upwardly extending filter tube 731. The filter unit 730 is insertable into the first cylindrical body 702 through the open first circular top 704 and is mountable in the first cylindrical body 702 proximate the first circular bottom 703 to create a fluid flow gap 706 between the filter plate 723 and the closed first circular bottom 703 (see FIG. 7I especially). The fluid flow gap 706 is separated from a mixture of water and solid beverage making material (e.g. coffee grounds or tea leaves) in the outer cylinder 701 by the filter plate 723. The filter hub 721 is generally circular and has a diameter extending to the inner surface 705 of the first cylindrical body 702, the filter hub 721 comprising a second elastomeric circular seal 722 (depicted as an O-ring) surrounding an outside perimeter of the filter hub 721 to form a seal between the filter hub 721 and the inner surface 705 of the first cylindrical body 702 of the outer cylinder 701.

The filter hub 721 comprises an annular ring 735 forming the perimeter of the filter hub 721 and an upwardly extending centrally located hollow receiver 736, the receiver 736 supported by raised buttresses 737 radially extending between the receiver 736 and the annular ring 735. The receiver 736 comprises a through aperture sized to receive the upwardly extending filter tube 731. The receiver 736 comprises an annular abutment surface 738 extending radially into the through aperture on which the upwardly extending filter tube 731 rests when inserted into the through aperture. The annular abutment surface 738 preferably extends into the through aperture no farther than the thickness of the wall of the filter tube 731. The filter hub 721 further comprises a cavity 724 formed beneath the radially extending raised buttresses 737 in which the filter plate 723 is nestable. The filter plate 723 may be shaped and sized to fit properly in the cavity 724.

The filter plate 723 comprises a frame 726 and an upwardly extending boss 727 attached to a middle of the frame 726, the boss 727 having screw threads 728 on an outer surface thereof. The boss 727 comprises a channel 729. The filter tube 731 has an open bottom end and an open top end 733. An inside surface of the open bottom end of the filter tube 731 comprises screw threads 734 configured to mate with the screw threads 728 of the boss 727. The boss 727 is thereby attachable to the upwardly extending filter tube 731 by virtue of the mating screw threads 728, 734. The connection between the filter tube 731 and the filter plate 723 is thereby sealed. The open bottom end of the filter tube 731 opens out under the filter plate 723 through the channel 729 in the boss 727, and the open top end 733 opens out above the filter plate 723. The filter hub 721 and the filter plate 723 comprise aligned apertures 725 to permit beverage to flow from the outer cylinder 702 through the filter 760 into the fluid flow gap 706, thereby separating the beverage from solid beverage making material.

The filter hub 721, filter plate 723, filter 760 and filter tube 731 are four separable parts of the filter unit 730. Being separable, the individual parts may be cleaned more easily, and the parts may be replaced separately in the event of breakage or in the event a different style of the part is desired. For example, different filters may be used without the need to use a different filter hub or filter tube. The filter 760 may be a wire mesh (e.g. stainless steel), a filter paper, etc. or layers thereof. For example, a wire mesh alone is suitable for brewing tea from tea leaves because a wire mesh is usually sufficient to prevent tea leaves from entering the fluid flow gap 706 during pressing. For brewing coffee, it is preferable to use both a wire mesh and a filter paper because coffee grounds may be fine enough to pass through the wire mesh to enter the fluid flow gap 706 during pressing.

The parts may be secured together by mounting the filter 760 on the filter plate 723 by passing the cylindrical boss 727 of the filter plate 723 through a central aperture 765 in the filter 760, inserting the bottom end of the filter tube 731 into the hollow receiver 736 of the filter hub 721, and screwing the cylindrical boss 727 of the filter plate 723 into the open bottom end of the filter tube 731. As the filter is tightened on the filter tube 731, the bottom of the filter tube 731 engages an upper side of the annular abutment surface 738 and the filter plate 723 nests in the cavity 724 to engage a lower side of the filter hub 721 thereby clamping the filter hub 721 between the filter plate 723 and filter tube 731, and clamping the filter 760 between the filter plate 723 and the filter hub 721.

The open bottom end of the filter tube 731 is in fluid communication with the fluid flow gap 706. The filter tube 731 extends upwardly from a center of the filter plate 723, and the filter tube 731 has an outer diameter smaller than a diameter of the central orifice 715 in the second circular bottom 713. With the filter unit 730 inserted in the first cylindrical body 702, the filter tube 731 is aligned with the central orifice 715 permitting the inner cylinder 711 to slide in the outer cylinder 701 along the filter tube 731. A third elastomeric circular seal 718 (depicted as a grommet) surrounding the perimeter of the central orifice 715 forms a seal between the second circular bottom 713 and the filter tube 731. The grommet 718 comprises an annular notch that engages an annular protuberance on an inside surface of the central orifice 715 to hold the grommet 718 securely in place during operation of the beverage maker 700. The filter unit 730 is removable from the outer cylinder 701 to facilitate loading and cleaning the beverage maker 700.

The beverage maker 700 further comprises two lids, a first lid 741 securable to the top of the inner cylinder 711 and a second lid 742 securable to a top of the first lid 741. The first lid 741 comprises screw threads 743 around an inner surface of the first lid 741 proximate an open bottom 748 of the first lid 741, which are mated with screw threads 744 around the outer surface and proximate the top of the second cylindrical body 712 of the inner cylinder 711. The first lid 741 can thus be screwed on to the top of the inner cylinder 711. The chamfer 720 on the outer surface of the second cylindrical body 712 has an upper abutment surface 745 against which a lower surface 746 of the first lid 741 abuts and forms a seal when the first lid 741 is fully engaged with the second cylindrical body 712. The first lid 741 has an open top 747 and screw threads 749 around an outer surface of the first lid 741 proximate the open top 747. The open top 747 has a smaller diameter than the open bottom 748. The first lid 741 may have a wall thickness sufficient to form a generally flush outer surface interface 752 between the first lid 741 and the outer surface of the first cylindrical body 702 when the inner cylinder 711 is pressed fully into the outer cylinder 701 and the first lid 741 is fully engaged with the inner cylinder 711, as best seen in FIG. 7A. Such an arrangement provides a further seal against leakage at the first lid 741.

The second lid 742 is a cap having a closed top 750. The second lid 742 comprises screw threads 751 around an inner surface of the second lid 742, which mate with the screw threads 749 proximate the top of the first lid 741. Screwing the second lid 742 on to the top of the first lid 741 when the beverage maker 700 is fully assembled seals the inside of the beverage maker 700 from the external environment, thereby preventing or minimizing leakage of the contents of the beverage maker 700. Once the beverage is prepared, it is possible to drink some of the beverage through the open top 747 of the first lid 741 by removing the second lid 742 and then re-sealing the beverage in the beverage maker 700 by re-engaging the second lid 742 with the first lid 741.

The beverage maker 700 may be used to prepare a beverage in essentially the same manner as described previously for other embodiments. However, in preparing the beverage a user may use the closed top 750 of the second lid 742 as a surface on which to press the inner cylinder 711 into the outer cylinder 701. Loosening the second lid 742 on the first lid 741 can provide sufficient opportunity for air to escape from the hollow inside 716 of the inner cylinder 711 during the pressing process to ensure that back air pressure does not prevent the pressing process.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A beverage maker comprising:
    an outer receptacle having a side wall and a closed bottom for containing a mixture of a liquid and a solid beverage making material;
    a filter element mountable within the outer receptacle, the filter element sealingly engaged with the side wall of the outer receptacle when mounted to inhibit flow of fluid between the filter element and the side wall of the outer receptacle, the filter element dividing the outer receptacle when mounted into a fluid flow space between the filter element and the closed bottom and a holding space between the filter element and a top of the outer receptacle where the liquid and solid beverage making material are mixed in a mixing zone to make the mixture;
    an inner housing having a beverage receptacle therein for containing a beverage to be drunk, the inner housing configured to be received in and slide in the outer receptacle, the inner housing sealingly engaged with the side wall of the outer receptacle to inhibit flow of fluid between the inner housing and the side wall of the outer receptacle when the inner housing slides within the outer receptacle, the filter element configured to remain substantially stationary and to filter the mixture to provide the beverage in the fluid flow space as the inner housing slides in the outer receptacle toward the closed bottom; and,
    at least one fluid flow conduit fluidly connecting the fluid flow space to the beverage receptacle, wherein the inner housing comprises a bottom having a through aperture into the beverage receptacle, and wherein the at least one fluid flow conduit comprises a tube extending between the filter element and the beverage receptacle through the mixing zone and through the through aperture as the inner housing slides in the outer receptacle toward the closed bottom.

2. The beverage maker according to claim 1, the tube sealingly engaged with the filter element to inhibit fluid flow between the tube and the mixing zone, the tube sealingly engaged with the through aperture to inhibit fluid flow between the holding space and the beverage receptacle.

3. The beverage maker according to claim 2, wherein the filter element and the tube are part of a removable filter unit, the tube attached the filter element in the filter unit.

4. The beverage maker according to claim 3, wherein the tube and the filter element are separable.

5. The beverage maker according to claim 4, wherein the filter element comprises a filter disposed between a filter hub and a filter plate, wherein the filter, filter hub and filter plate are separable from one another, and wherein the tube and the filter plate are removably joinable to secure at least a portion of the filter hub between the tube and the filter plate when the tube is joined to the filter plate thereby securing the securing the filter hub, filter plate, filter and tube to form the filter unit.

6. The beverage maker according to claim 2, wherein the outer receptacle, the inner housing and the tube are concentric.

7. The beverage maker according to claim 2, wherein the tube has a closed top and one or more openings in a side of the tube proximate the closed top.

8. The beverage maker according to claim 2, wherein the tube comprises a protuberance configured to prevent the inner housing from sliding beyond a pre-set depth in the outer receptacle.

9. The beverage maker according to claim 8, wherein the protuberance is a section of the tube having a larger diameter than a diameter of the through aperture.

10. The beverage maker according to claim 1, wherein the filter element comprises a perimetrical upwardly extending barrier configured to contain the solid beverage making material and configured to prevent the inner housing from sliding beyond a pre-set depth in the outer receptacle.

11. The beverage maker according to claim 1, wherein the outer receptacle comprises a lower portion having a smaller cross-sectional area than an upper portion of the outer receptacle thereby preventing the inner housing from sliding beyond a pre-set depth in the outer receptacle.

12. The beverage maker according to claim 1, wherein the outer receptacle and inner housing are cylindrical.

13. The beverage maker according to claim 1, further comprising a vented lid configured to engage the inner housing to assist with sliding the inner housing in the outer receptacle, and configured to engage the top of the outer receptacle to prevent the inner housing from continuing to slide toward the closed bottom once the inner housing has reached a pre-determined depth in the outer receptacle.

14. The beverage maker according to claim 13, wherein the lid is securable to the top of the outer receptacle or to a top of the inner housing, and the lid seals a gap between the inner housing and outer receptacle when the inner housing is at the pre-determined depth.

15. The beverage maker according to claim 1, further comprising: a first lid removably securable to a top of the inner housing, the first lid having an open top; and, a second lid removably securable to the open top of the first lid, the second lid having a closed top, wherein the first lid engages the top of the outer receptacle to form a seal between the inner housing and the outer receptacle.

16. The beverage maker according to claim 15, wherein the inner housing and the outer receptacle comprise complementary chamfered portions that permit nesting of the inner housing in the outer receptacle at a pre-determined depth thereby preventing sliding of the inner housing in the outer receptacle beyond the pre-determined depth.

17. The beverage maker according to claim 1, wherein the closed bottom comprises a removable cap sealingly engageable with the outer receptacle to inhibit fluid flow between the fluid flow space and an outside environment.

18. The beverage maker according to claim 1, further comprising a valve configured to inhibit fluid flow from the beverage receptacle through the at least one fluid flow conduit into the fluid flow space.

19. The beverage maker according to claim 18, wherein the valve is a one-way valve in the at least one fluid flow conduit.

20. The beverage maker according to claim 1, wherein the liquid comprises water and the solid beverage making material comprises coffee or tea.

* * * * *